United States Patent
Saini et al.

(10) Patent No.: US 10,275,894 B2
(45) Date of Patent: Apr. 30, 2019

(54) METHODS AND SYSTEMS FOR DETECTION OF ARTIFACTS IN A VIDEO AFTER ERROR CONCEALMENT

(71) Applicant: Interra Systems, Inc., Cupertino, CA (US)

(72) Inventors: Sugeet Singh Saini, Amritsar (IN); Akshi Raina, Jammu (IN); Bhupender Kumar, Palwal (IN); Shekhar Madnani, Noida (IN)

(73) Assignee: Interra Systems, Cupertino, CA (US)

( * ) Notice: Subject to any disclaimer, the term of this patent is extended or adjusted under 35 U.S.C. 154(b) by 499 days.

(21) Appl. No.: 15/009,719

(22) Filed: Jan. 28, 2016

(65) Prior Publication Data

US 2017/0223383 A1   Aug. 3, 2017

(51) Int. Cl.
*G06T 7/254*   (2017.01)
*G06T 7/00*   (2017.01)

(52) U.S. Cl.
CPC ............ *G06T 7/254* (2017.01); *G06T 7/0004* (2013.01); *G06T 2207/20036* (2013.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 6,614,847 B1* | 9/2003 | Das | ...................... | H04N 19/537 375/240.15 |
| 8,509,552 B1* | 8/2013 | Biswas | .................. | H04N 7/014 382/232 |
| 2011/0261264 A1* | 10/2011 | Zafarifar | ................ | H04N 5/145 348/699 |
| 2013/0322529 A1* | 12/2013 | Henry | .................. | H04N 19/105 375/240.12 |
| 2015/0334398 A1* | 11/2015 | Socek | ....................... | G06T 7/11 375/240.26 |

\* cited by examiner

*Primary Examiner* — William C Vaughn, Jr.
*Assistant Examiner* — Stuart D Bennett
(74) *Attorney, Agent, or Firm* — Benjamin Balser; Next IP Law Group

(57) ABSTRACT

A method and system for detection of artifacts in a video after application of an error concealment strategy by a decoder is disclosed. An absolute difference image is determined by subtraction of a current image and a previously decoded image. A threshold marked buffer is determined to replace the pixel values of the absolute difference image with a first pixel value or a second pixel value, based on comparison of pixel values with a first predefined threshold. A candidate region is determined by determining a pair of edges of the threshold marked buffer having length above a second predefined threshold, distance between them above a third predefined threshold, and pixel values between them in the absolute difference image, less than a fourth predefined threshold. Validation of candidate region is based on comparison of characteristics of the candidate region with characteristics of the current image and/or previously decoded images.

18 Claims, 14 Drawing Sheets

| 1 | 5 | 1 | 2 | 4 | 5 | 4 | 2 |
|---|---|---|---|---|---|---|---|
| 40 | 41 | 42 | 44 | 44 | 35 | 36 | 41 |
| 10 | 12 | 11 | 10 | 11 | 12 | 10 | 11 |
| 8 | 8 | 6 | 2 | 1 | 2 | 3 | 4 |
| 8 | 8 | 6 | 2 | 1 | 2 | 3 | 4 |
| 8 | 8 | 6 | 2 | 1 | 2 | 3 | 4 |
| 43 | 40 | 41 | 42 | 46 | 33 | 30 | 41 |
| 1 | 5 | 1 | 2 | 4 | 5 | 4 | 2 |

1002b / 1004b:

| 10 | 15 | 11 | 20 | 24 | 15 | 14 | 12 |
|----|----|----|----|----|----|----|----|
| 15 | 12 | 11 | 31 | 41 | 25 | 10 | 8  |
| 10 | 12 | 11 | 10 | 11 | 12 | 10 | 11 |
| 8  | 8  | 6  | 2  | 1  | 2  | 3  | 4  |
| 8  | 8  | 6  | 2  | 1  | 2  | 3  | 4  |
| 8  | 8  | 6  | 2  | 1  | 2  | 3  | 4  |
| 8  | 10 | 11 | 33 | 42 | 41 | 38 | 30 |
| 10 | 5  | 21 | 12 | 14 | 25 | 14 | 12 |

FIG. 11

METHODS AND SYSTEMS FOR DETECTION OF ARTIFACTS IN A VIDEO AFTER ERROR CONCEALMENT

FIELD OF THE DISCLOSURE

The present disclosure is generally related to detection of artifacts in a video and more particularly to detection of artifacts in one or more images of a video after application of error concealment strategy by a decoder.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

During transmission of a video stream over a lossy transmission channel, data corresponding to one or more regions of the video stream may be lost. When such a video with lost data is decoded by a decoder at the receiver, the rendered video content may be riddled with one or more artifacts such as blocking artifacts, corrupted content, and the like. For example, when multiple regions of data are lost while transmission, the rendered video may comprise gray regions that correspond to the lost regions. In scenarios, when multiple regions are combined to form a slice before transmitting, a loss of data corresponding to the transmitted slice may result in blanking of an entire region corresponding to the slice in the rendered signal. In certain other scenarios, the aforementioned artifacts may be introduced in the rendered video due to block-based encoding applied to compress the data corresponding to the video stream at the encoder. As the applied block-based encoding may correspond to a lossy compression technique, the transmitted data corresponding to the video stream may not be reproducible leading to artifacts in the rendered video content. To avoid such artifacts in the decoded signal, one of the mostly adopted error concealment techniques by the decoders is to replace the lost region with the corresponding region from a previously decoded frame. Such a replacement makes use of the inherent property of redundancy of the transmitted video stream.

In accordance with the existing techniques of error concealment, one or more parameters associated with filters at the decoder may be controlled for recovery of lost regions. Other techniques of error concealment comprise division of a region around a lost ration into a plurality of regions to calculate edge orientation of each of the plurality of regions. The data corresponding to the lost region may be retrieved based on directional interpolation in the direction of the calculated edge orientations. In accordance with other error concealment technique, the header of the received frames may be analysed to determine the presence of the lost regions. Based on the analysis, the error regions may be isolated to improve the quality of the received content. Other error concealment techniques make use of an adaptive mix of Forward Error Correction (FEC) and/or Automatic Repeat Request (ARQ) to reduce the errors in the received content.

However, when the video comprises significant motion in the constituting frames, the aforementioned error concealment techniques may not be effective. For example, in case of significant motion variation associated with the frames of the video stream, the decoded video after error concealment may comprise frozen regions that may not be spatially related to adjacent regions. Similarly, the aforementioned error concealment technique may not yield satisfactory results when the frames constituting the video stream are temporally related. Hence, in order to pre-empt the occurrence of an artifact in the rendered video content and to enhance the quality of the rendered video content, it may be desirable to detect artifacts even after error concealment has been performed by the decoder.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an example embodiment, a method for detecting artifacts in one or more decoded images of a video after application of error concealment strategy by a decoder is provided. The method may comprise determining an absolute difference image by subtracting a current image and a previously decoded image. A Threshold Marked Buffer (FMB) is determined by comparing pixel values of the determined absolute difference image with a first predefined threshold. The pixel values of the determined absolute difference image are replaced with a first pixel value and a second pixel value based on the comparison. A candidate region is then determined by determining a pair of edges in the determined TMB, such that the length of the pair of edges is above a second predefined threshold, the distance between the pair of edges is above a third predefined threshold, and the pixels between the pair of edges in the determined absolute difference image, having pixel values less than a fourth predefined threshold. Such detected candidate region is then validated based on comparison of one or more characteristics of the detected candidate region with respect to one or more characteristics of the current image and/or one or more characteristics of previously decoded images. In an aspect, the one or more characteristics may correspond to a formation of an edge corresponding to the detected candidate region, in the current image and/or the previously decoded image. In another aspect, the characteristics may correspond to orientation of an edge of the first region and the second region. In another aspect, the one or more characteristics may correspond to a motion profile of the current image and a motion profile of the one or more previously decoded images, in a region corresponding to a vicinity of edges of the detected candidate region. In yet another aspect, the characteristics may correspond to motion vectors and corresponding sum of absolute difference associated with the current image and the previously decoded image.

The one or more characteristics to be validated may be selected by a user or one or more characteristics may be validated in sequential order or in parallel based on the requirement. For example, only one of the characteristics may be used for validation. In another example, all the characteristics as defined in the disclosure may be used for validation in yet another example, the user using the described procedure for determining artifacts due to error concealment may be provided a choice for selecting one or more characteristics that may be validated. Moreover, the validation of different characteristics may be performed either in a sequential manner or in parallel.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 10 illustrates a validation of the detected candidate region based on formation of an edge, in accordance with the method for detection of artifacts in one or more images of a video after application of error concealment strategy by the decoder.

FIG. 11 illustrates a non-maximal suppression of the edges of the detected candidate region, in accordance with the method for detection of artifacts in one or more images of a video after application of error concealment strategy by the decoder.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
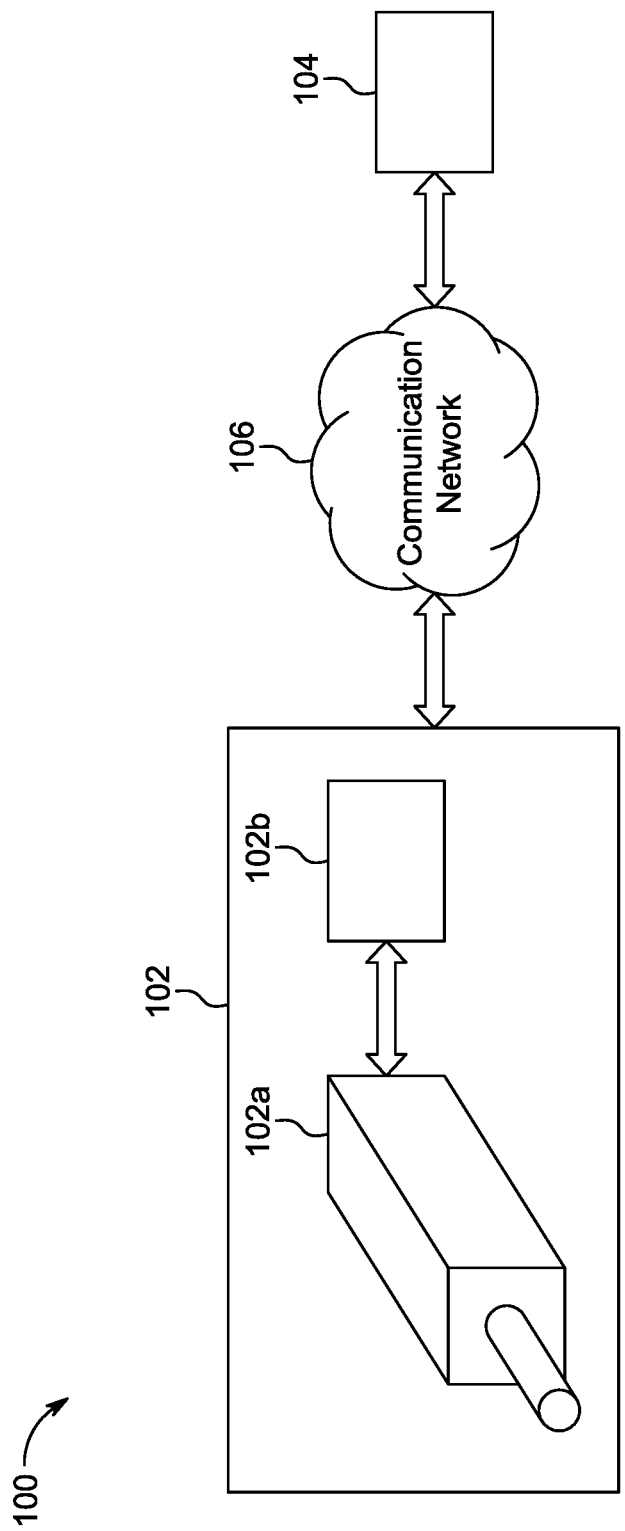
FIG. 1 illustrates a network environment for implementation of the disclosed method and system for detection of artifacts in one or more images of a video after application of error concealment strategy by a decoder.

FIG. 1 illustrates a network environment for implementation of the disclosed method and system for detection of artifacts in one or more images of a video after application of error concealment strategy by a decoder. The network environment 100 comprises an image capturing device 102a and an encoder 102b that may constitute a first electronic device 102. The network environment may further comprise a second electronic device 104 that may correspond to a receiver of the images captured by the image capturing device 102a. The images captured by the image capturing device 102a may be communicated to the second electronic device 104 via the communication network 106.

In operation, the images captured by the image capturing device 102a may correspond to raw video. The raw video may be encoded by the encoder 102b based on the one or more video codecs, such as H.265/MPEG-H HEVC codecs, H.264/MPEG-4 AVC codecs, H.263/MPEG-4 Part 2 AVC codecs, and/or the like. The encoded video may be transmitted to the second electronic device 104, via the communication network 106. The video may be a combination of temporally related one or more images. The one or more images may comprise a first set of even fields and a second set of odd fields. The one or more images may further comprise one or more frames. A person of ordinary skill in the art will appreciate that the following description relates to the application of the disclosed method on the fields of the one or more images and/or the one or more frames of the one or more images.

At the second electronic device 104, the decoder may decompress the received video in accordance with the coding scheme used at the encoder 102b. The encoded data corresponding to one or more regions that correspond to the fields and/or the one or more frames of the captured video may be lost during the transmission. In such scenarios, the decoder at the electronic device 104 may apply an error concealment strategy in order to minimise the artifacts that may be visible in the rendered decoded video as a result from the loss of the one or more regions. However, due to the temporal relation of the one or more fields and/or one or more frames of the video and/or a high motion associated with the captured one or more images, the artifacts may not be minimised.

The electronic device 104 may determine one or more erroneous regions and/or stripes that correspond to the artifact in the received video in the received one or more images of the video. The electronic device 104 may determine an absolute difference image by determining difference between a current image and a previously decoded image of the video. The electronic device 104 may compare one or more pixel values in the absolute difference image with a first predefined threshold. The electronic device 104 may replace the pixel values less than the first predefined threshold with a predetermined value, based on the comparison. The absolute difference image obtained after such a comparison and replacement may correspond to a threshold marked buffer (TMB). The electronic device 104 may further perform an erode operation on the TMB to discard (by masking) small edges or speckles that might be present due to noise or fine object movements etc. The detailed description for determination of the absolute difference image has been provided in detail in FIG. 3.

The electronic device 104 may determine edges that may correspond to the erroneous regions and/or stripes in order to detect a candidate region. In an aspect, the electronic device 104 may calculate a vertical gradient of the TMB. The vertical gradient may be calculated by taking pixel-by-pixel absolute difference of adjacent rows of the TMB after an erode operation is performed by the electronic device 104. The image after the aforementioned operation may be referred as a Difference Image Vertical Gradient Buffer (DIVGB). In each row of the determined DIVGB, a count of continuous pixels marked as "255" may be determined and compared with a line length threshold. The horizontal edges of the candidate region correspond to rows for which the count of continuous pixels is greater than the line length threshold. Further, the distance between the identified rows must be greater than a predefined minimum stripe width. The area enclosed by the identified edges of the candidate region may correspond to the erroneous region and/or stripe.

Figure 3:
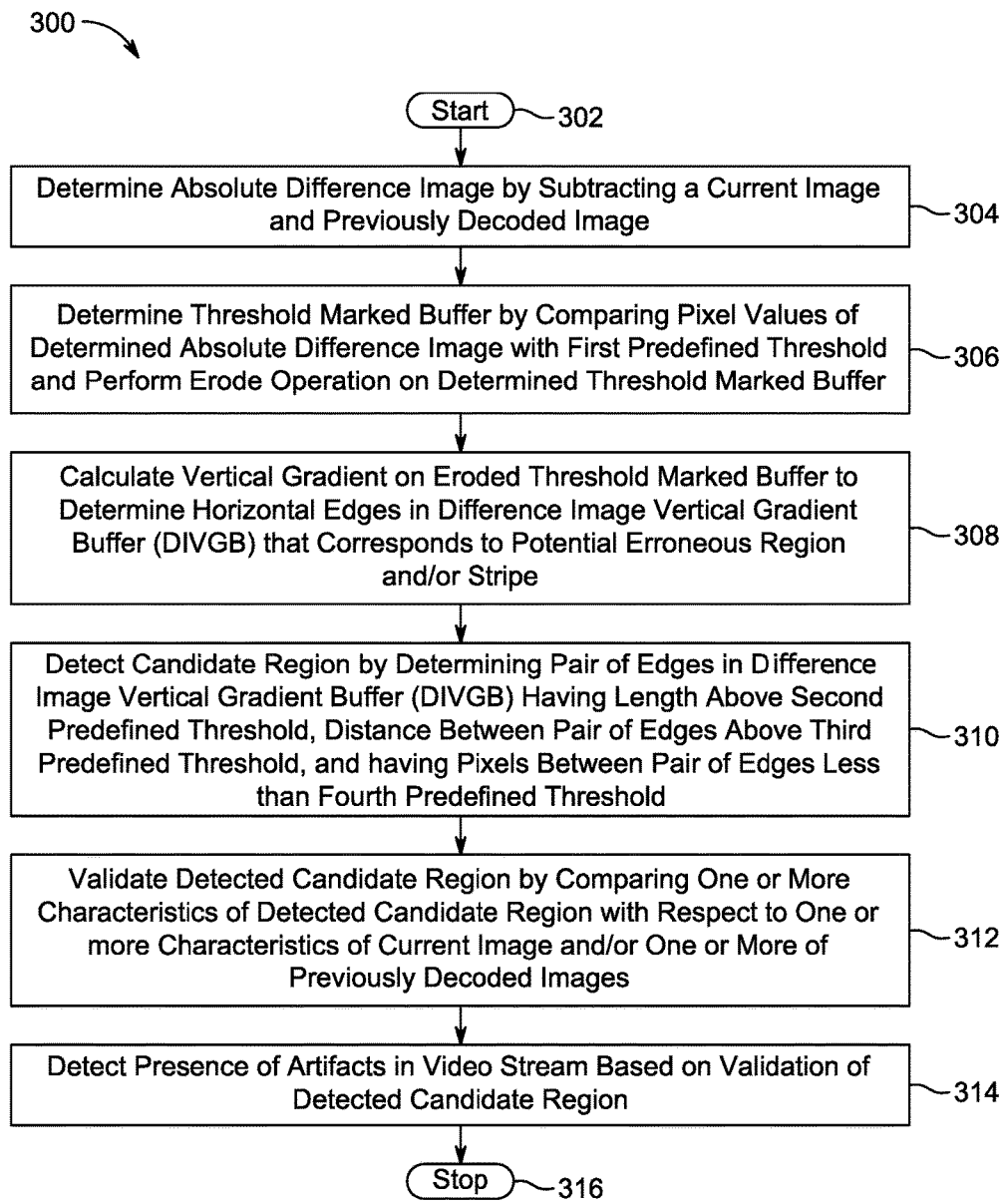
FIG. 3 illustrates a flow diagram for implementation of a first method for detection of artifacts in one or more images of a video by the decoder.

The detailed description of the foregoing description vis-à-vis the DIVGB has been provided in detail in the FIG. 3.

The electronic device 104 may determine the erroneous regions and/or stripes based on the determination of a pair of horizontal edges of the candidate region. In an example embodiment, the electronic device 104 may determine the erroneous regions and/or stripes based on the determination of a pair of vertical edges of the candidate region. In an example embodiment, the electronic device 104 may determine the erroneous region and/or stripes based on a first vertical edge and a first horizontal edge, and a second vertical edge and a second horizontal edge.

The determined candidate region that comprises the erroneous regions and/or stripes may be validated in order to detect the artifacts. The artifacts may be detected based on a comparison of one or more characteristics of the detected candidate region with one or more characteristics of the current image and/or one or more previously decoded images.

In an aspect, the one or more characteristics may correspond to a formation of an edge that corresponds to the detected candidate region, in the current image and/or the previously decoded image. In such a scenario, the electronic device 104 may determine a gradient image of the current image and a gradient image of the previously decoded image. The electronic device 104 may further determine a first region in the gradient image of the current image corresponding to one or more edges of the detected candidate region and a second region in the gradient image of the previously decoded image corresponding to the one or more edges of the detected candidate region. The electronic device 104. The electronic device 104 may further determine a first count of pixels for which a gradient value in the pair of edges of the determined first region of the gradient image of the current image is greater than a gradient threshold. The electronic device 104 may further determine a second count of pixels for which a gradient value in the pair of edges of the determined second region of the gradient image of the previously decoded image is greater than the gradient threshold. The electronic device 104 may further validate detected candidate region as the artifact if the first count of pixels is greater than the second count of pixels by a fifth predefined threshold, as explained in FIG. 5.

In an aspect, the one or more characteristics may correspond to orientation of an edge, of a first region of the candidate region that corresponds to the current image. The first region may correspond to a region inside the candidate region. The one or more characteristics may further correspond to orientation of an edge of a second region adjacent to the candidate region that corresponds to the determined absolute difference image. The electronic device 104 may determine a first set of orientations of one or more edges of the first region. The electronic device 104 may further determine an orientation of a principal edge of the first region based on a histogram of the first set of orientations of the one or more edges of the first region, the orientation of the principal edge of the first region corresponds to a bin index having maximum value in the histogram of the first set of orientations. The electronic device 104 may further determine a second set of orientations of one or more edges of the second region. The electronic device 104 may further determine an orientation of a principal edge of the second region, based on a histogram of the second set of orientations of the one or more edges of the second region, the orientation of a principal edge of the second region corresponds to a bin index having maximum value in the histogram of the second set of orientations. The electronic device 104 may further validate the detected candidate region as the artifact if the absolute difference of the bin index corresponding to the first region and the second region is less than a sixth predefined threshold, as explained in FIG. 6. The edges of the detected candidate region in the determined absolute difference image and the current image are determined by application of a filter selected from the group consisting of Gabor filter, Sobel filter, Canny edge detector, Prewitt filter, and Robert cross operator, and the like.

In an example embodiment, the one or more characteristics may correspond to motion profiles associated with the current image and the one or more of the previously decoded images, in a region that corresponds to a vicinity of edges of the detected candidate region. The electronic device 104 may determine a first difference image based on computation of a difference of the current image and a preceding previously decoded image. The electronic device 104 may further determine one or more of other difference images based on computation of a difference of the one or more pair of previously decoded images. The electronic device 104 may further validate the detected candidate region as the artifact when at least a count of pixels having a non-zero value, associated with the determined one or more other difference images is greater than a seventh predefined threshold, a count of pixels having a non-zero value, associated with the determined first difference image, in a region adjacent to an area corresponding to the detected candidate region, is greater than an eighth predefined threshold, or a maximum of absolute pixel value associated with one or more pixels in an region adjacent to the detected candidate region, in first difference image, is greater than a ninth predefined threshold. Further details of validation of the detected candidate region as the artifact based on one or more characteristics that correspond to motion profile of current image and motion profile of one or more previously decoded images are provided in FIG. 7.

In an example embodiment, the one or more characteristics may correspond to motion vectors associated with the current image and the previously decoded image. The electronic device 104 may determine the motion vector and the corresponding sum of absolute difference for a region enclosed by the detected candidate region, a region above the detected candidate region, and a region formed by overlap of the detected candidate region and the region above the detected candidate region. The electronic device 104 may further validate the detected candidate region as the artifact when at least the determined sum of absolute difference for the region enclosed by the detected candidate region is less than a tenth predefined threshold, the determined sum of absolute difference for the region above the detected candidate region is less than an eleventh predefined threshold, and the determined sum of absolute difference for the region formed by the overlap of the region enclosed by the detected candidate region and the region above the detected candidate region is greater than a twelfth predefined threshold. The twelfth predefined threshold is greater than the eleventh predefined threshold and eleventh predefined threshold is greater than the tenth predefined threshold. Further details of validation of the detected candidate region as the artifact based on based on one or more characteristics that correspond to motion vectors and corresponding sum of absolute (SAD) difference associated with current image and previously decoded image, are provided in FIG. 8.

A person of ordinary skill in the art will appreciate that the validation of the candidate region may be performed by the electronic device 104 based on a comparison of the combination of one or more of the characteristics of the candidate region associated with the current image, the one or more previously decoded images, and/or the absolute difference image.

In an example embodiment, based on the validation of the detected one or more candidate regions, the electronic device 104 may detect one or more artifacts associated with the received one or more images of the video. Further, the electronic device 104 may perform one or more steps to remove or minimize the detected artifacts before the received video is rendered on a display device.

In an example embodiment, a method for detection of artifacts in one or more images of a video after application of error concealment strategy by a decoder of the electronic device 104 may comprise determination of an absolute difference image by subtraction of a current image and a previously decoded image, received from the image capturing device 102, via the communication network 106. The method may further comprise determination of a Threshold Marked Buffer (TMB) by comparing pixel values of the determined absolute difference image with a first predefined threshold. The pixel values of the determined absolute difference image are replaced with a first pixel value and a second pixel value based on the comparison. The method may further comprise detection of a candidate region by determination of a pair of edges in the determined TMB, such that the length of the pair of edges is above a second predefined threshold. Further, the distance between the pair of edges is above a third predefined threshold, and the pixels between the pair of edges, in the determined absolute difference image is less than a fourth predefined threshold. The method may further comprise validation of detected candidate region based on comparison of one or more characteristics of the detected candidate region with respect to one or more characteristics of the current image and/or one or more of previously decoded images. In an aspect, the detected candidate region may comprise a region of pixels or a slice of pixels, in another aspect, the pair of edges may comprise a pair of horizontal edges and/or a pair of vertical edges. The method may further comprise performing an erode operation on the determined threshold marked buffer to remove pixels or a slice of pixels from the threshold marked buffer, based on a predefined mask. The method may further comprise determining vertical gradients for the determined threshold marked buffer by calculating a difference of the alternate rows of the eroded threshold marked buffer.

Figure 2:
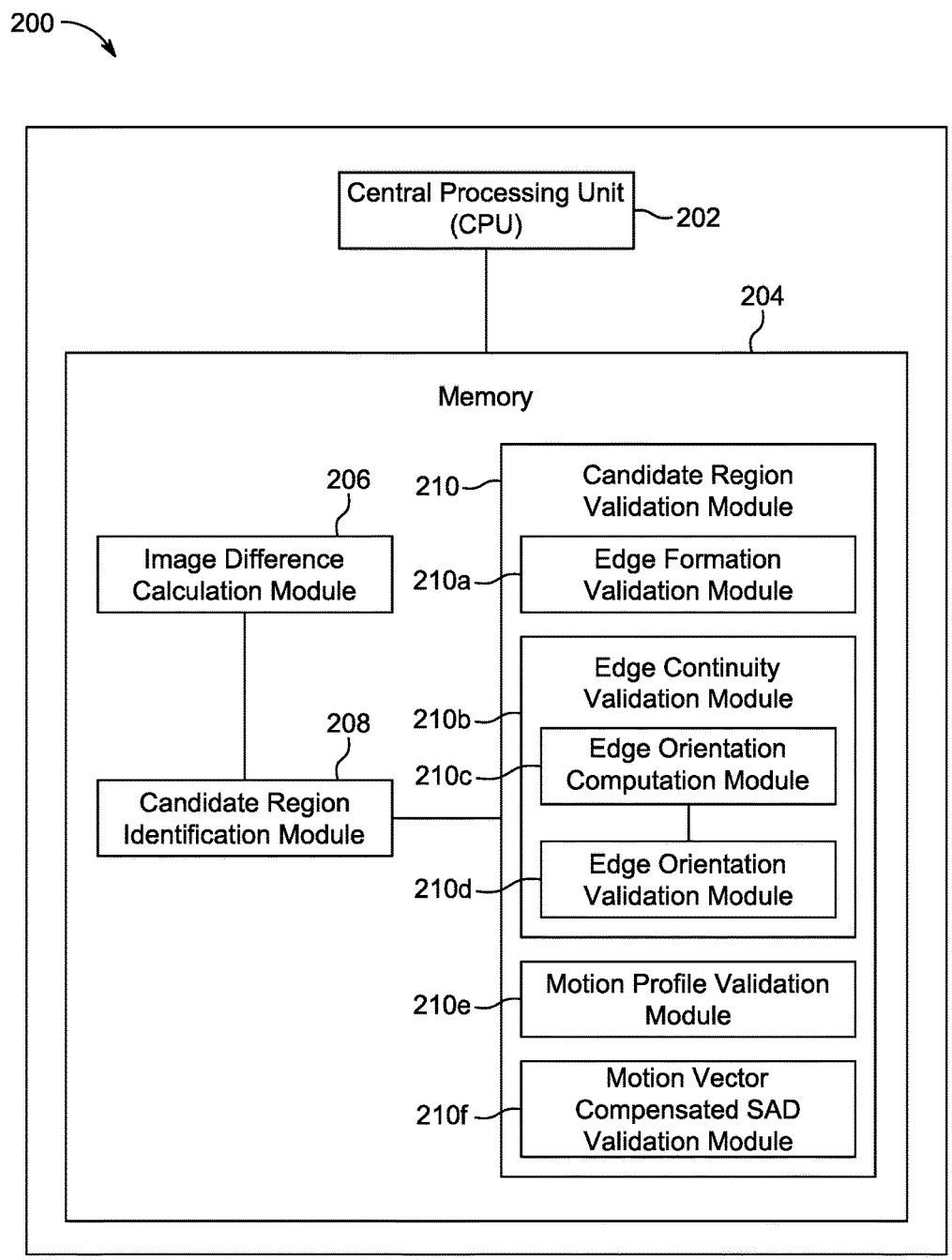
FIG. 2 illustrates a block diagram of a system for detection of artifacts in one or more images of a video after application of error concealment strategy by the decoder.

FIG. 2 illustrates a block diagram of a system for detection of artifacts in one or more images of a video after application of error concealment strategy by the decoder. With reference to the region diagram 200, there are shown one or more units of the electronic device 104. FIG. 2 is explained in conjunction with the elements disclosed in FIG. 1. In an implementation, the electronic device 104 may correspond to a laptop, desktop, smartphone, or any other apparatus having at least a central processing unit (CPU) 202 and a memory means 204. The received video from the image capturing device 102 may be stored in a memory 204 of the electronic device 104 and no external source may be required.

The CPU 202 executes computer program instructions stored in the memory 204. The CPU 202 may also be configured to decode and execute any instructions received from the external sources through the communication network 108. The CPU 202 may also execute one or more client applications. The CPU 202 may include one or more general purpose processors (e.g., INTEL microprocessors) and/or one or more special purpose processors (e.g., digital signal processors). The CPU 202 may be configured to execute computer-readable program instructions, such as program instructions to carry out any of the functions described in this description.

The memory 204 includes a computer readable medium including volatile and/or non-volatile storage components, such as optical, magnetic, organic or other memory or disc storage, which may be integrated in whole or in part with a processor, such as CPU 202. Alternatively, the memory may be remotely located and coupled to the CPU 202 by connection mechanism and/or network cable. The memory 204 is enabled to store various types of data. For instance, the memory 204 may store one or more identifiers related to the electronic device 104 and computer-readable program instructions executable by the CPU 202. In an aspect, the memory 204 may store the video that needs to be analyzed. The memory 204 also includes one or more programming modules that comprise one or more instructions executable by the CPU 202. The memory 204 may comprise one or more modules, such as an image difference calculation module 206, a candidate region identification module 208, and a candidate region validation module 210. The candidate region validation module 210 may further comprise an edge formation validation module 210a edge formation validation module 210a, an edge continuity validation module 210b, a motion profile validation module 210e, and/or a motion vector compensated SAD validation module 210f. The edge continuity validation module 210b may further comprise an edge orientation computation module 210c and/or an edge orientation validation module 210d.

A person of ordinary skill in the art will appreciate that each of the modules of the diagram 200 may comprise one or more instruction sets that may be stored in the memory 204 associated with the electronic device 104. The foregoing one or more stored modules may be controlled by a central processing unit 202 to perform the steps to implement the method to detect an artifact.

In an example embodiment, the CPU 202 may be configured to execute one or more instructions of the image difference calculation module 206 to calculate an absolute difference image based on a difference of the current image and a previously decoded image of the received video. The CPU 202 may be configured to execute one or more instructions of the candidate region identification module 208 to identify a candidate region based on the determined absolute difference image. The CPU 202 may be configured to execute one or more instructions of the candidate region identification module 208 to determine a Threshold Marked Buffer (TMB) by comparing pixel values of the determined absolute difference image with a first predefined threshold. The pixel values of the determined absolute difference image are replaced with a first pixel value and a second pixel value based on the comparison. The CPU 202 may be configured to execute one or more instructions of the candidate region identification module 208 to determine a pair of edges in the determined TMB, such that the length of the determined edges is greater than a second predefined threshold. The CPU 202 may be configured to execute one or more instructions of the candidate region identification module 208 to determine the candidate region when the distance between a pair of edges (a pair of horizontal edges, a pair of vertical edges, or a combination thereof) is greater than a third predefined threshold. The CPU 202 may be configured to execute one or more instructions of the candidate region identification module 208 to determine the candidate region when the values that correspond to the pixels between the pair of edges in determined the absolute difference image are less than a fourth predefined threshold.

In an example embodiment, the CPU 202 may be configured to execute one or more instructions of the candidate region validation module 210 to validate the identified candidate region in order to determine the presence of artifacts in the video. The CPU 202 may be configured to execute one or more instructions of the edge formation validation module 210a of the candidate region validation module 210 to determine a gradient image of the current image and the previously decoded image. The CPU 202 may be configured to execute one or more instructions of the edge formation validation module 210a to determine a first region and a second region in the gradient image of the current image and the previously decoded image. The CPU 202 may be configured to execute one or more instructions of the edge formation validation module 210a to determine a first count of pixels for which the gradient value in a pair of edges of the current image is greater than a gradient threshold. The CPU 202 may be configured to execute one or more instructions of the edge formation validation module 210a to determine a second count of pixels that correspond to the second region, for which the gradient value in a pair of edges of the previously decoded image, are greater than the gradient threshold. The CPU 202 may be configured to execute one or more instructions of the edge formation validation module 210a to validate detected candidate region as artifact when the first count of pixels is greater than the second count of pixels by a fifth predefined threshold.

In an example embodiment, the CPU 202 may be configured to execute one or more instructions of the edge orientation computation module 210c of the edge continuity validation module 210b to detect orientation and magnitude of the one or more edges of the candidate regions that corresponds to current image and/or the determined absolute difference image. The CPU 202 may be configured to execute one or more instructions of the edge orientation computation module 210c to determine a first region that may comprise a region inside the detected candidate region of the current image. Based on the determined first region, the CPU 202 may be configured to execute one or more instructions of the edge orientation computation module 210c to determine a first set of orientations of one or more edges of the first region. The CPU 202 may be configured to execute one or more instructions of the edge orientation computation module 210c to determine an orientation of a principal edge of the first region based on a histogram of the first set of orientations of the one or more edges of the first region. The orientation of the principal edge of the first region corresponds to a bin index that has maximum value in the histogram of the first set of orientations.

The CPU 202 may be configured to execute one or more instructions of the edge orientation computation module 210c to determine a second region that may comprise a region adjacent to the detected candidate region corresponding to the determined absolute difference image. Based on the determined second region, the CPU 202 may be configured to execute one or more instructions of the edge orientation computation module 210c to determine a second set of orientations of one or more edges of the second region. The CPU 202 may be configured to execute one or more instructions of the edge orientation computation module 210c to determine an orientation of a principal edge of the second region based on a histogram of the second set of orientations of the one or more edges of the first region. The orientation of the principal edge of the second region corresponds to a bin index that has maximum value in the histogram of the second set of orientations.

The CPU 202 may be configured to execute one or more instructions of the edge orientation validation module 210d to determine an absolute difference of the bin index that corresponds to the first region and the bin index that corresponds to the second region. The CPU 202 may be configured to execute one or more instructions of the edge orientation validation module 210d to validate the detected candidate region as the artifact when the determined absolute difference of the bin indices is less than a sixth predefined threshold.

A person of ordinary skill in the art will appreciate that instead of the Gabor filter, one or more other filters may be selected for determination absolute difference image and the current image. Such one or more other filters may correspond to a Sobel filter. Canny edge detector, Prewitt filter, and Robert cross operator.

In an aspect, the one or more objects present in each of the images may comprise be associated motion. The motion profiles of each of the one or more images may be stored in the memory 204, by the CPU 202. Further, CPU 202 may be configured to execute one or more instructions of the motion profile validation module 210e to determine one or more of the first difference image based on computation of a difference of the current image and the one or more previously decoded images in pairs. The CPU 202 may be configured to execute one or more instructions of the motion profile validation module 210e to determine one or more of the other difference image based on computation of a difference of the one or more previously decoded images in pairs.

The CPU 202 may be configured to execute one or more instructions of the motion profile validation module 210e to validate the detected candidate region as the artifact based on a plurality of condition. The first condition of the plurality of conditions may include validation of the detected candidate region as the artifact when a count of pixels that have a non-zero value and are associated with the determined one or more other difference images, is greater than a seventh predefined threshold. The second condition of the plurality of conditions may include validation of the detected candidate region as the artifact when a count of pixels that have a non-zero value and are associated with the determined first difference image, in a region adjacent to an area corresponding to the detected candidate region, is greater than an eighth predefined threshold. The third condition of the plurality of conditions may include validation of the detected candidate region as the artifact when a maximum of absolute pixel value associated with one or more pixels in a region adjacent to the detected candidate region in the determined first difference image, is greater than a ninth predefined threshold.

The CPU 202 may be configured to execute one or more instructions of the motion vector compensated SAD validation module 210f to determine a motion vector and a sum of absolute difference (SAD) that corresponds to the motion vector, for a plurality of region. The plurality of regions may comprise a first region enclosed by the detected candidate region, a second region above the detected candidate region, and a third region formed by overlap of the detected candidate region and the region above the detected candidate region. The CPU 202 may be configured to execute one or more instructions of the motion vector compensated. SAD validation module 210f to validate the detected region as the artifact based on a comparison of the SAD for the plurality of regions with a plurality of thresholds. The plurality of thresholds comprises a tenth predefined threshold, an eleventh predefined threshold, and a twelfth predefined threshold, such that the twelfth predefined threshold is greater than the eleventh predefined threshold and eleventh predefined threshold is greater than the twelfth predefined threshold. Specifically, the CPU 202 may be configured to execute one or more instructions of the motion vector compensated SAD validation module 210f to validate the detected region as the artifact when the SAD for the first region is less than the tenth predefined threshold, the SAD for the second region is less than the eleventh predefined threshold, and the SAD for the third region is greater than the twelfth predefined threshold.

In another embodiment, a system for detection of artifacts in one or more images of a video after application of error concealment strategy by a decoder of the electronic device 104 may comprise one or more instructions in the image difference calculation module 206 executable by the CPU 202 to determine an absolute difference image by subtraction of the current image and the previously decoded image. The system may further comprise one or more instructions in the candidate region identification module 208 executable by the CPU 202 to determine a Threshold Marked Buffer (TMB) by comparing pixel values of the determined absolute difference image a first predefined threshold. The pixel values of the determined absolute difference image are replaced with a first pixel value and a second pixel value based on the comparison. The system may further comprise one or more instructions in the candidate region identification module 208 executable by the CPU 202 to detect a candidate region by determination of a pair of edges in the determined TMB such that the length of the pair of edges is above a second predefined threshold. Further, the distance between the pair of edges is above a third predefined threshold, and the pixels between the pair of edges in the determined absolute difference image are less than a fourth predefined threshold. The system may further comprise one or more instructions in the candidate region validation module 210 executable by the CPU 202 to validate the detected candidate region based on comparison of one or more characteristics of the detected candidate region with respect to one or more characteristics of the current image and/or one or more of previously decoded images. In an aspect, one or more images may comprise one or more decoded frames. In an aspect, one or more images may comprise a set of even fields and a set of odd fields, corresponding to the decoded images of the video. In an aspect, the detected candidate region comprises a region of pixels or a slice of pixels. In yet another aspect, the pair of edges comprise of a pair of horizontal edges, or a pair of vertical edges.

In an example embodiment, the one or more characteristics correspond to a formation of an edge corresponding to the detected candidate region, in the current image and/or the previously decoded image. The CPU 202 may be configured to determine a gradient image of the current image and a gradient image of the previously decoded image, by use of the edge formation validation module 210a. The CPU 202 may be further configured to determine a first region in the gradient image of the current image corresponding to one or more edges of the detected candidate region and a second region in the gradient image of the previously decoded image corresponding to the one or more edges of the detected candidate region, by use of the edge formation validation module 210a. The CPU 202 may be further configured to determine a first count of pixels for which a gradient value in the pair of edges of the determined first region of the gradient image of the current image is greater than a gradient threshold, by use of the edge formation validation module 210a. The CPU 202 may be further configured to determine a second count of pixels for which a gradient value in the pair of edges of the determined second region of the gradient image of the previously decoded image is greater than the gradient threshold, by use of the edge formation validation module 210a. The CPU 202 may be further configured to validate the detected candidate regions as the artifact if the first count of pixels is greater than the second count of pixels by a fifth predefined threshold, by use of the edge formation validation module 210a.

The first region comprises a region inside the detected candidate region corresponding to the current image and the second region comprises a region adjacent to the detected candidate region corresponding to the determined absolute difference image. The one or more characteristics to orientation of an edge of the first region and the second region. The CPU 202 may be configured to determine a first set of orientations of one or more edges of the first region, by se of use of edge orientation computation module 210c. The CPU 202 may be configured to determine an orientation of a principal edge of the first region based on a histogram of the first set of orientations of the one or more edges of the first region, the orientation of the principal edge of the first region corresponds to a bin index having maximum value in the histogram of the first set of orientations, by se of use of edge orientation computation module 210c. The CPU 202 may be configured to determine a second set of orientations of one or more edges of the second region, by se of use of edge orientation computation module 210c. The CPU 202 may be configured to determine an orientation of a principal edge of the second region, based on a histogram of the second set of orientations of the one or more edges of the second region, the orientation of a principal edge of the second region corresponds to a bin index having maximum value in the histogram of the second set of orientations, by se of use of edge orientation computation module 210c. The CPU 202 may be configured to validate the detected candidate region as the artifact if the absolute difference of the bin index corresponding to the first region and the second region is less than a sixth predefined threshold, by se of use of edge orientation validation module 210d.

In an example embodiment, the one or more characteristics correspond to a motion profile of the current image and a motion profile of the one or more previously decoded images, in a region corresponding to a vicinity of edges of the detected candidate region. The CPU 202 may be configured to determine a first difference image based on computation of a difference of the current image and a preceding previously decoded image, by use of the motion profile validation module 210e. The CPU 202 may be configured to determine a one or more of other difference images based on computation of a difference of the one or more pair of previously decoded images, by use of the motion profile validation module 210e. The CPU 202 may be configured to validate the detected candidate region as the artifact, by use of the motion profile validation module 210e. The detected candidate region may be validated as the artifact when at least a count of pixels having a non-zero value, associated with the determined one or more other difference images is greater than a seventh predefined threshold, a count of pixels having a non-zero value, associated with the determined first difference image, in a region adjacent to an area corresponding to the detected candidate region, is greater than an eighth predefined threshold, or a maximum of pixel value associated one or more pixels in an region adjacent to the detected candidate region, in the first difference image, is greater than a ninth predefined threshold.

In an example embodiment, the one or more characteristics correspond to motion vectors and corresponding sum of absolute difference associated with the current image and the previously decoded image. The CPU 202 may be configured to determine the motion vector and the corresponding sum of absolute difference for a region enclosed by the detected candidate region, a region above the detected candidate region, and a region formed by overlap of the detected candidate region and the region above the detected candidate region, by use of the motion vector compensated SAD validation module 210f. The CPU 202 may be configured to validate the detected candidate region as the artifact if at least the determined sum of absolute difference for the region enclosed by the detected candidate region is less than a tenth predefined threshold, the determined sum of absolute difference for the region above the detected candidate region is less than an eleventh predefined threshold, and the determined sum of absolute difference for the region formed by the overlap of the region enclosed by the detected candidate region and the region above the detected candidate region is greater than a twelfth predefined threshold. In an aspect, the twelfth predefined threshold is greater than the eleventh predefined threshold and eleventh predefined threshold is greater than the tenth predefined threshold.

FIG. 3 illustrates a flow diagram for implementation of a first method for detection of artifacts in one or more images of a video after application of error concealment strategy by the decoder. FIG. 3 is explained in conjunction with the elements disclosed in FIGS. 1 and 2.

The flowchart 300 starts at step 302 and proceeds to step 304. At step 304, an absolute difference image may be determined based on a subtraction of a current image and a previously decoded image, by execution of one or more instructions of the image difference calculation module 206 by the CPU 202. In an example embodiment, the electronic device 104 may determine one or more erroneous regions and/or stripes that correspond to an artifact in the received one or more images of the video. At step 306, in the determined absolute difference image, the obtained pixel values of the absolute difference image may be compared with a first predefined threshold, such as a value "5". Based on the comparison, the pixel values less than the first predefined threshold may be replaced with a value, such as "255" and the pixel values greater than the predefined threshold may be replaced with the value "0". In aspect, the first predefined threshold may be based on a value provided in real-time by a user of the electronic device 104. In another embodiment, the first predefined threshold may be a pre-configured value. The absolute difference image obtained after such a comparison and replacement may correspond to a threshold marked buffer (TMB).

In an aspect, an erode operation may be performed on the TMB by the electronic device 104. Such an operation is performed to discard small edges present in the TMB due to noise or very fine movements, and the like. For example, when the mask of width "7" and height "1", is applied on each pixel of TMB, all pixels overlapping with the mask will be set to "0" if any of the pixel is not marked with "255". The result of the erode operation may be referred to as an eroded TMB.

In an example embodiment, edges that may correspond to the erroneous regions and/or stripes may be determined by the electronic device 104 in order to detect a candidate region. At step 308, vertical gradient may be calculated on the eroded TMB to determine the horizontal edges that correspond to the potential erroneous region and/or stripe. The vertical gradient may be calculated by taking pixel-bypixel absolute difference of adjacent rows of the eroded TMB. The vertical gradient may be determined based on the equation (1):

$$V(x,y) = \text{abs}(I(x,y) - I(x,y-1)) \quad (1)$$

where, V(x, y) corresponds to a vertical gradient at a column 'x' and a row 'y' of the eroded TMB, and I(x, y) corresponds to an intensity value at a column 'x' and a row 'y' of the eroded TMB. The eroded TMB after determination of the vertical gradient may be referred to a Difference Image Vertical Gradient Buffer (DIVGB). In an aspect, the region between the validated edges within DIVGB where the values of the pixels is less than a fourth predefined threshold such as "5", may correspond to a potential candidate region.

At step 310, candidate region may be detected by determination of a pair of edges in the DIVGB, such that the length of the pair of edges is above a second predefined threshold, a distance between the pair of edges is above a third predefined threshold, and the pixels between the pair of edges in the absolute difference image are less than a fourth predefined threshold. The detection of the candidate region may be performed by execution of one or more instructions of the candidate region identification module 208 by the CPU 202. Specifically, with respect to the determined DIVGB, the candidate region may be detected based on a comparison of the second, third, and the fourth predefined thresholds with one or more parameters associated with the one or more edges (horizontal edges and/or vertical edges) of the DIVGB. For example, a count of continuous pixels marked as "255" in a row of the one or more rows of the DIVGB may be compared with the second predefined threshold that corresponds to a line length threshold, "LINE_LENGTH_THRESHOLD". If the count is greater than the line length threshold, then these are identified as the edges of the candidate region. Further, the start and end coordinates of such identified edges in one or more rows may be saved in the memory 204 by the CPU 202.

In addition to the foregoing step of comparison, a distance between two adjacent edges identified within DIVGB may be compared with the third predefined threshold, "MIN_STRIPE_WIDTH". In scenarios, when the regions between two adjacent edges having distance between them greater than "MIN_STRIPE_WIDTH", and when pixel values of pixels in such a region are less than the fourth predefined threshold such as "5", such a region are identified as candidate region. For example, if all the pixel values of pixels between adjacent edges corresponding to region are less than fourth predefined threshold, then the region will be treated as candidate region. The diagrammatic representation of the detection of the candidate region has been depicted in FIG. 9.

In an example embodiment, instead of using one or more horizontal rows for detection of candidate region, one or more vertical columns may be used. In another embodiment, a combination of a first pair of a horizontal row and a vertical row, and a second pair of horizontal row and a vertical row, may be used for detection of the candidate region, in accordance with the foregoing description.

At step 312, the detected candidate region may be validated as the erroneous region and/or stripe that correspond to an artifact, based on a comparison of one or more characteristics of the detected candidate region that may correspond to the current image, the previously decoded image, and/or the absolute difference image. The validation of the candidate region may be performed by execution of one or more instructions of the candidate region validation module 210 by the CPU 202. The validation of detected candidate region as the artifact has been explained in detail in FIG. 4.

At step 314, the presence of the artifact in the received one or more images of the video may be detected based on the validation of the detected candidate region as the artifact. The control passes to the end step 316.

Figure 4:
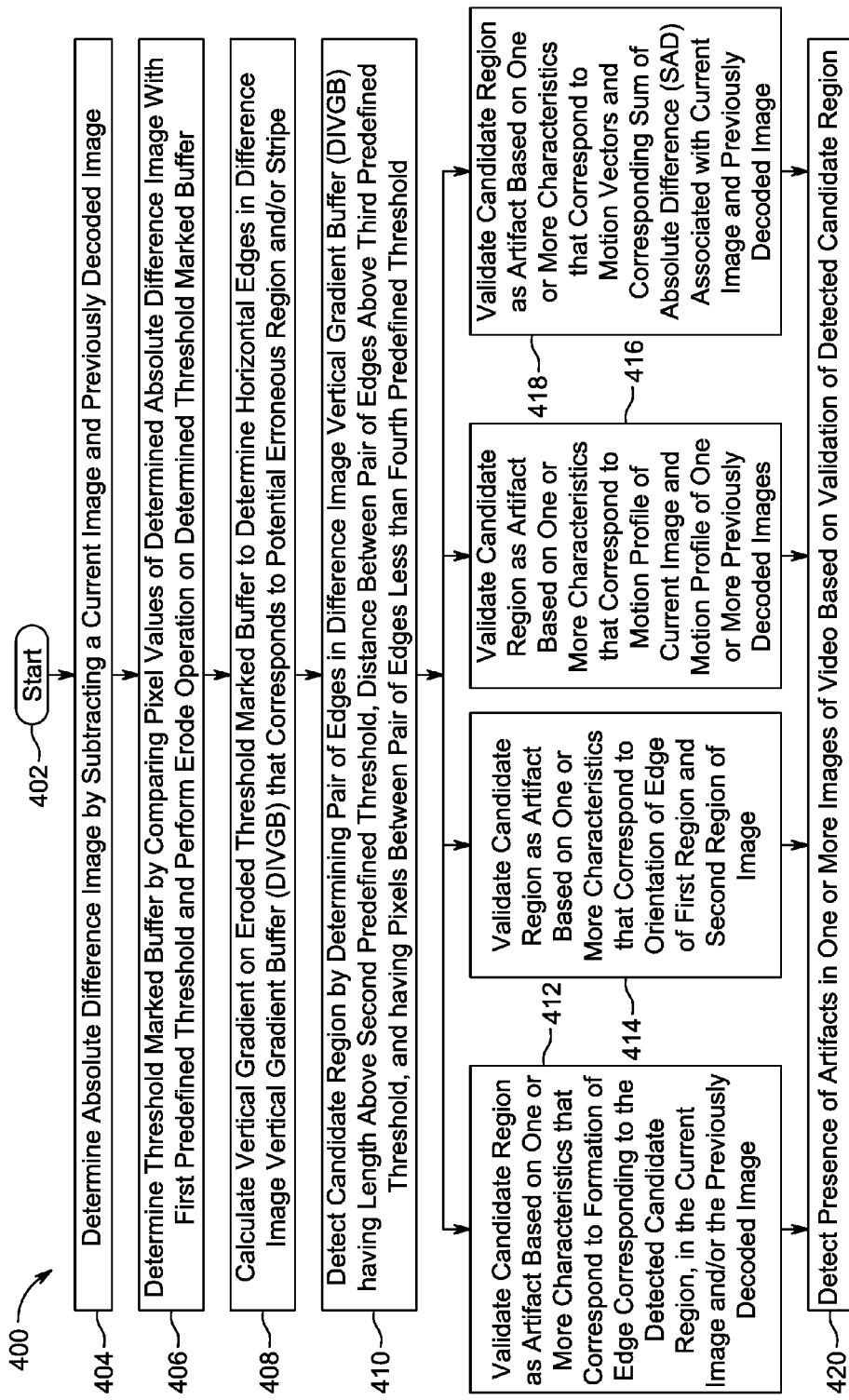
FIG. 4 illustrates a flow diagram for implementation of a second method for detection of artifacts in one or more images of a video after application of error concealment strategy by the decoder.

FIG. 4 illustrates a flow diagram for implementation of a second method for detection of artifacts in one or more images of a video after application of error concealment strategy by the decoder. FIG. 4 is explained in conjunction with the elements disclosed in FIGS. 1 to 3 and FIGS. 9 to 14.

With reference to the FIG. 4 there is shown a flowchart 400 that starts at step 402 and proceeds to step 404. The steps 404 to 408 correspond to the steps 304 to 308, explained in detail in FIG. 3. At step 404, an absolute difference image may be determined based on a subtraction of a current image and a previously decoded image. At step 406, a Threshold Marked Buffer (TMB) may be determined by comparison of pixel values of determined absolute difference image with first predefined threshold (as explained in FIG. 3). Further, an erode operation may be performed on the TMB by the electronic device 104, in order to discard small edges present in the TMB due to noise or very fine movements, and the like. At step 408, vertical gradient may be calculated on the eroded TMB to determine the horizontal edges that correspond to the potential erroneous region and/or stripe, in accordance with equation (1), as explained in FIG. 3. The eroded TMB after determination of the vertical gradient may be referred to a Difference Image Vertical Gradient Buffer (DIVGB). At step 410, a candidate region may be detected by determination of a pair of edges in the DIVGB, such that the length of the pair of edges is above a second predefined threshold, a distance between the pair of edges is above a third predefined threshold, and the pixels between the pair of edges in the absolute difference image are less than a fourth predefined threshold.

At step 412, the candidate region may be validated as artifact based on one or more characteristics that correspond to formation of an edge corresponding to the detected candidate region, in the current image and/or the previously decoded image. Such a validation may be performed by execution of one or more instructions of the edge formation validation module 210a, by the CPU 202.

At step 414, the candidate region may be validated as artifact based on one or more characteristics that correspond to orientation of an edge of the first region that comprises a region inside the detected candidate region that corresponds to the current image, and the second region that comprises a region adjacent to the detected candidate region that corresponds to the determined absolute difference image. Such a validation may be performed by execution of one or more instructions of the edge continuity validation module 210b, by the CPU 202.

At step 416, the candidate region may be validated as artifact based on one or more characteristics that correspond to a motion profile of the current image and a motion profile of the one or more previously decoded images, in a region that corresponds to a vicinity of edges of the detected candidate region. Such a validation may be performed by execution of one or more instructions of the motion profile validation module 210e, by the CPU 202.

At step 418, the candidate region may be validated as artifact based on one or more characteristics that correspond to motion vectors and corresponding sum of absolute (SAD) difference associated with the current image and the previously decoded image. Such a validation may be performed by execution of one or more instructions of the motion vector compensated SAD validation module 210f, by the CPU 202.

At step 420, the presence of the artifacts in the one or more images of the video may be detected based on the validation of the candidate region. The control passes to end step 422. A person of ordinary skill in the art will appreciate that the method steps may be executed by the CPU 202 such that a plurality of steps may be executed in a parallel or in a sequential order.

Figure 5:
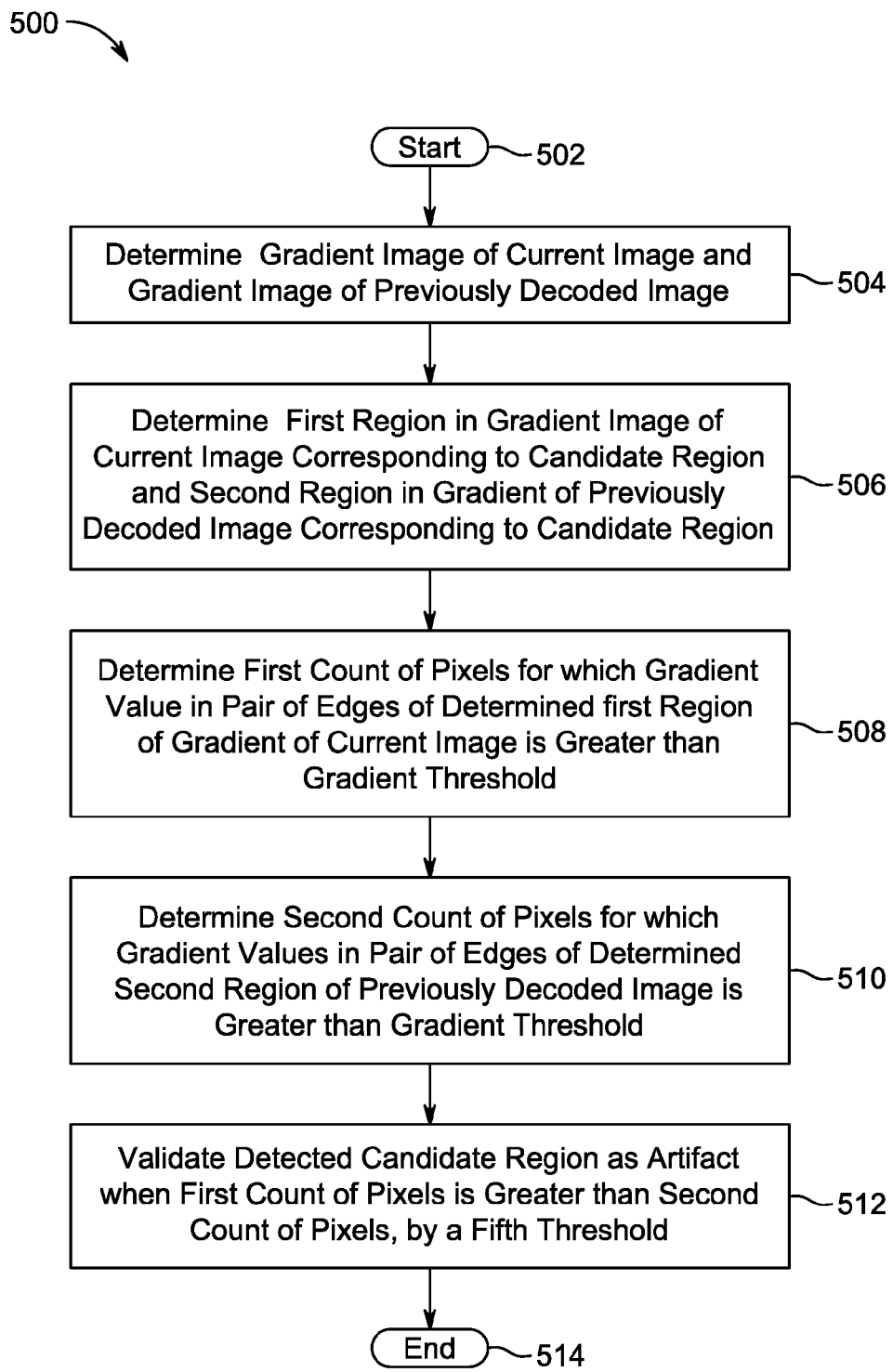
FIG. 5 illustrates a flow diagram for implementation of a first method for validation of the candidate region as artifact in one or more images of a video after application of error concealment strategy by the decoder.

FIG. 5 illustrates a flow diagram for implementation of a first method for validation of the candidate region as artifact in one or more images of a video after application of error concealment strategy by the decoder. FIG. 5 is explained in conjunction with the elements disclosed in FIGS. 1 to 4 and FIGS. 9 to 14.

With reference to FIG. 5, there is shown a flowchart 500 that corresponds to the one or more steps for validation of the detected candidate region as artifact based on one or formation of an edge, in accordance with the step 408 of the flowchart 400. The flowchart starts at step 502 and proceeds to step 504.

At step 504, a gradient image of the current image and a gradient image of the previously decoded image may be determined. In an aspect, the gradient images may be determined based on a vertical gradient. In another aspect, the gradient image of the current image may correspond to the gradient image 1002a, and the gradient image of the previously decoded image may correspond to the gradient image 1002b, depicted in FIG. 10. Further, the candidate region 1004a may correspond to the gradient image 1002a, and the candidate region 1004b may correspond to the gradient region 1004b.

At step 506, a first region and a second region may be determined by the execution of one or more instructions of the edge formation validation module 210a, by the CPU 202. The first region and the second region may correspond to one or more boundaries of the candidate region 1004a and the candidate region 1004b, respectively. At step 508, a first count of pixels for which the gradient values that correspond to the boundary of the candidate region 1004a, are greater than gradient threshold, such as "GRADIENT_THRESHOLD". For example, when the value of the "GRADIENT_THRESHOLD" is "39", the first count is "12" ("6" each for the top and bottom boundaries of the candidate region 1004a).

At step 510, a second count of pixels for which the gradient values that correspond to the boundary of the candidate region 1004b, are greater than a gradient threshold, such as the "GRADIENT_THRESHOLD". For example, when the value of the "GRADIENT_THRESHOLD" is "39", the second count is "3" ("1" each for the top boundary and "2" for the bottom boundary, of the candidate region 1004b).

At step 512, the detected candidate region 1004a may be validated as the artifact when the first count of pixels is greater than or equal to the second count of pixels, by a fifth predefined threshold. For example, in case of the gradient images 1002a and 1002b, the first count "12" is greater than the second count "3" by a difference value of "9". When the value of the fourth threshold is "1", the candidate region 1004a may be validated as the artifact as the difference value of the first count and the second count "9", is greater than the value of the fourth threshold "1". The control passes to step 514.

Figure 6:
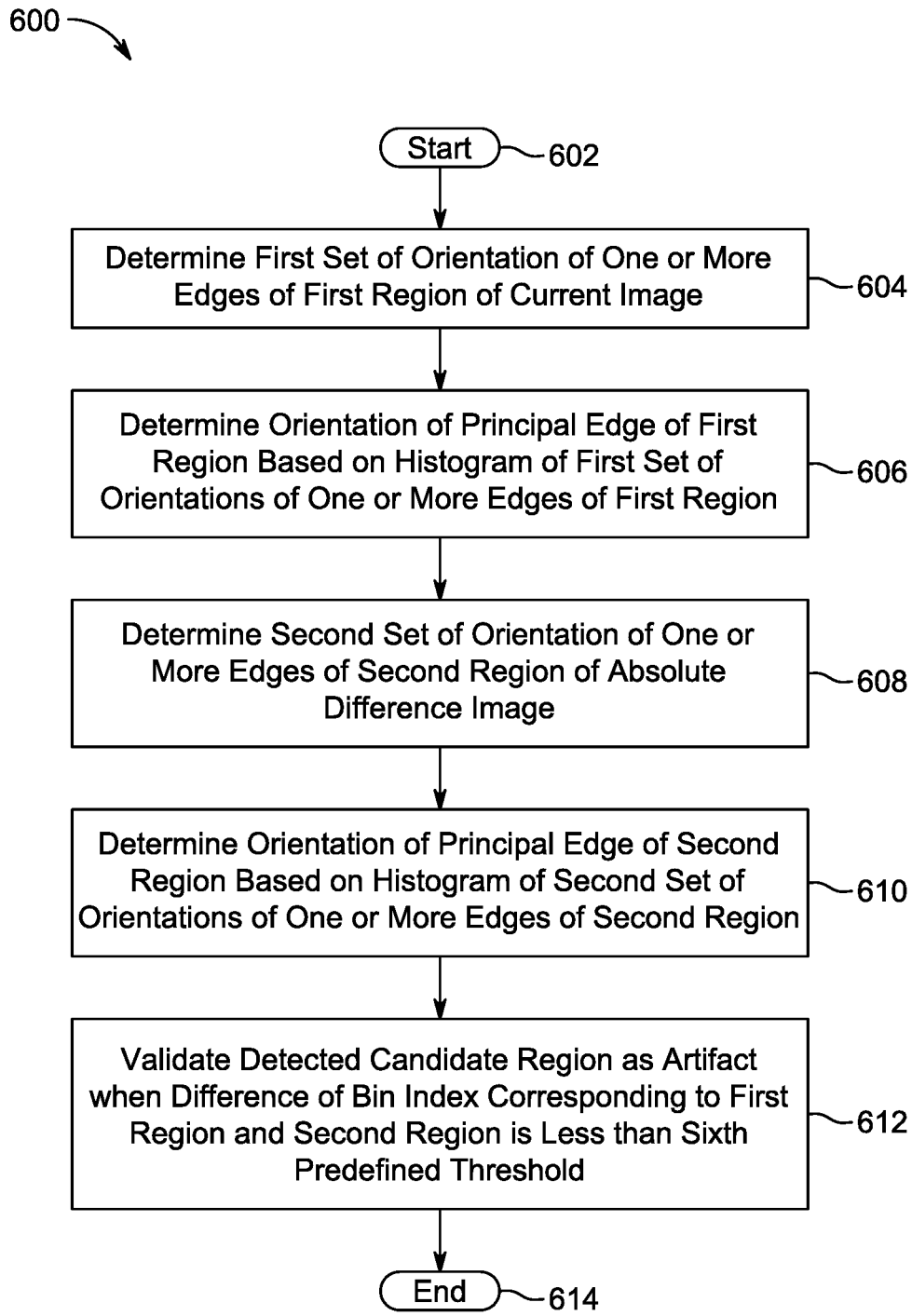
FIG. 6 illustrates a flow diagram for implementation of a second method for validation of the candidate region as artifact in one or more images of a video after application of error concealment strategy by the decoder.

FIG. 6 illustrates a flow diagram for implementation of a second method for validation of the candidate region as artifact in one or more images of a video after application of error concealment strategy by the decoder. FIG. 6 is explained in conjunction with the elements disclosed in FIGS. 1 to 4 and FIGS. 11 to 14.

With reference to FIG. 6, there is shown a flowchart 600 that corresponds to the one or more steps for validation of the detected candidate region as artifact based on orientation of an edge, in accordance with the step 410 of the flowchart 400. The flowchart starts at step 602 and proceeds to step 604. At step 604, a first set of orientation of the one or more edges of the region that corresponds to the first region may be determined by execution of one or more instructions of the edge orientation computation module 210c by the CPU 202. In an aspect, the first region comprises a region inside the detected candidate region that corresponds to the current image.

At step 606, an orientation of a principal edge of the first region may be determined by the CPU 202. The determination of the orientation may be based on one or more steps that correspond to Gabor filtering. In an aspect, Gabor filter may be applied on the current image at the orientation of "0 degrees". The result "GABOR_CURR_0" may be stored in the memory 204. Similarly, Gabor filter may be applied on the current image at the orientation of "90 degrees". The result "GABOR_CURR_90" may be stored in the memory 204. Subsequently, for each pixel of the current image, a magnitude "GABOR_CURR_MAG" may be computed by the CPU 202 based on the equation (2):

$$\text{GABOR\_CURR\_MAG} = \text{GABOR\_CURR\_0}(i,j)^2 + \text{GABOR\_CURR\_90}(i,j)^2 \qquad (2)$$

where, "i" corresponds to a row index of a pixel and "j" corresponds to a column index of a pixel.

Further, Gabor filter may be applied on the absolute difference image at the orientation of "0 degrees". The result "GABOR_DIFF_0" may be stored in the memory 204. Similarly, Gabor filter may be applied on the absolute difference image at the orientation of "90 degrees". The result "GABOR_DIFF_90" may be stored in the memory 204. Subsequently, for each pixel of the current image, a magnitude "GABOR_DIFF_MAG" may be computed by the CPU 202 based on the equation (3):

$$\text{GABOR\_DIFF\_MAG} = \text{GABOR\_DIFF\_0}(i,j)^2 + \text{GABOR\_DIFF\_90}(i,j)^2 \qquad (3)$$

where, "i" corresponds to a row index of a pixel and "j" corresponds to a column index of a pixel.

In an example embodiment, the one or more edge thinning techniques, such as a non-maximal suppression may be performed on the computed magnitudes "GABOR_CURR_MAG" and "GABOR_DIFF_MAG", to obtain pixel wide edges. An edge orientation may be computed, by the CPU 202, at each of the pixel, in accordance with equation (4):

$$\partial = \tan^{-1}(dy/dx) \qquad (4)$$

where, "dy" corresponds to a response of the Gabor filter at "90 degrees" and "dx" corresponds to a response of the Gabor filter at "0 degrees". Upon moving in the direction of the computed orientation, when the value of the "GABOR_CURR_MAG" and "GABOR_DIFF_MAG" are maximum, then the value of the "GABOR_CURR_MAG" and "GABOR_DIFF_MAG" is retained. In instances, when the value of the "GABOR_CURR_MAG" and "GABOR_DIFF_MAG" is not maximum, then the value of the "GABOR_CURR_MAG" and "GABOR_DIFF_MAG"

is replaced by "0". The non-maximal suppression has been explained in detail in FIG. 11.

For each of the pixel inside the first region an orientation of the edge of the first region at that pixel may be computed, in accordance with the equation (4). Subsequently, a histogram of the computed orientation of the edges of the first region may be computed, by the CPU 202. To compute the histogram of orientations, the computed orientations of the pixels inside the first region may be mapped with a bin to which the value of the computed orientation is closest to. Further, the value of the orientation may be added to the bin. For example, in instance when the number of bins are four, such that a "Bin 0" corresponds to "0 degree", "Bin 1" corresponds to "45 degree", "Bin 2" corresponds to "90 degree", and "Bin 3" corresponds to "135 degree", a computed orientation of "12 degrees" will be mapped to "Bin 0". Similarly, a computed orientation of "34 degrees" will be mapped to "Bin 1". Further, the value of the computed. Gabor Filter Magnitude will be added to the values of the mapped bin. Accordingly, the orientation of the principal edge of the first region corresponds to a bin index having maximum value in the histogram of the first set of orientations.

At step 608, a second set of orientation of the one or more edges of the region that corresponds to the second region may be determined by execution of one or more instructions of edge orientation computation module 210c. In an example embodiment, the second region comprises a region adjacent to the detected candidate region corresponding to the determined absolute difference image. At step 610, an orientation of the principal edge of the second region may be determined by the CPU 202, similar to the determination of the orientation of the principal edge of the first region (as described in step 606).

Figure 12:
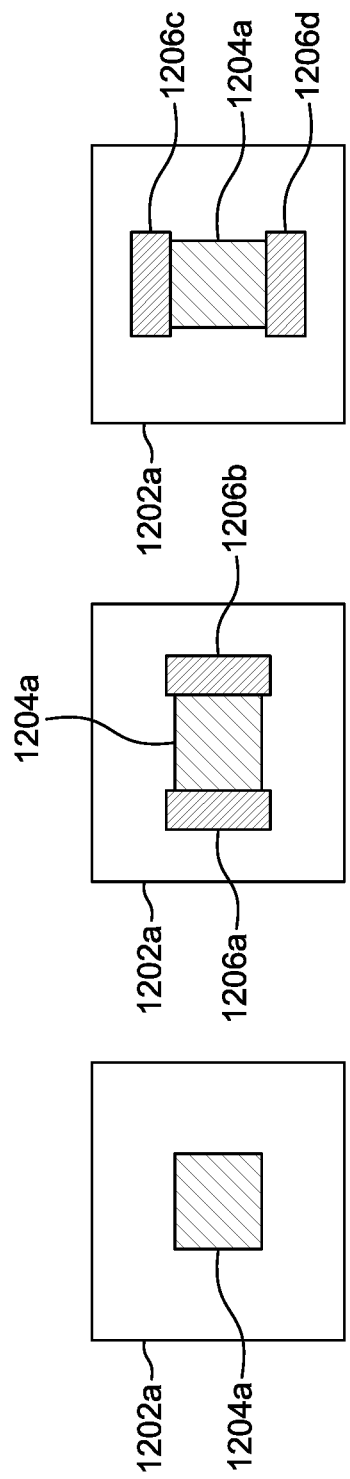
FIG. 12 illustrates a validation of the detected candidate as artifact region based on an orientation of an edge of the candidate region, in accordance with the method for detection of artifacts in one or more images of a video after application of error concealment strategy by the decoder.

The selection of the second region adjacent to the detected candidate region may be based on the computed orientation for the second region. For example, for an absolute difference image 1202a with candidate region 1204a, when the determined orientation is "0 degree", the second region may correspond to the areas 1206a and 1206b (as depicted in FIG. 12). Similarly, when the determined orientation is "90 degrees", the second region may correspond to the areas 1206c and 1206d.

At step 612, the detected candidate region may be validated as artifact based on the execution of one or more instructions of the edge orientation validation module 210d by the CPU 202. The detected candidate region may be validated as artifact when an absolute difference of bin indices that correspond to the first region and the second region is less than sixth predefined threshold. The control passes to step 614.

Figure 7:
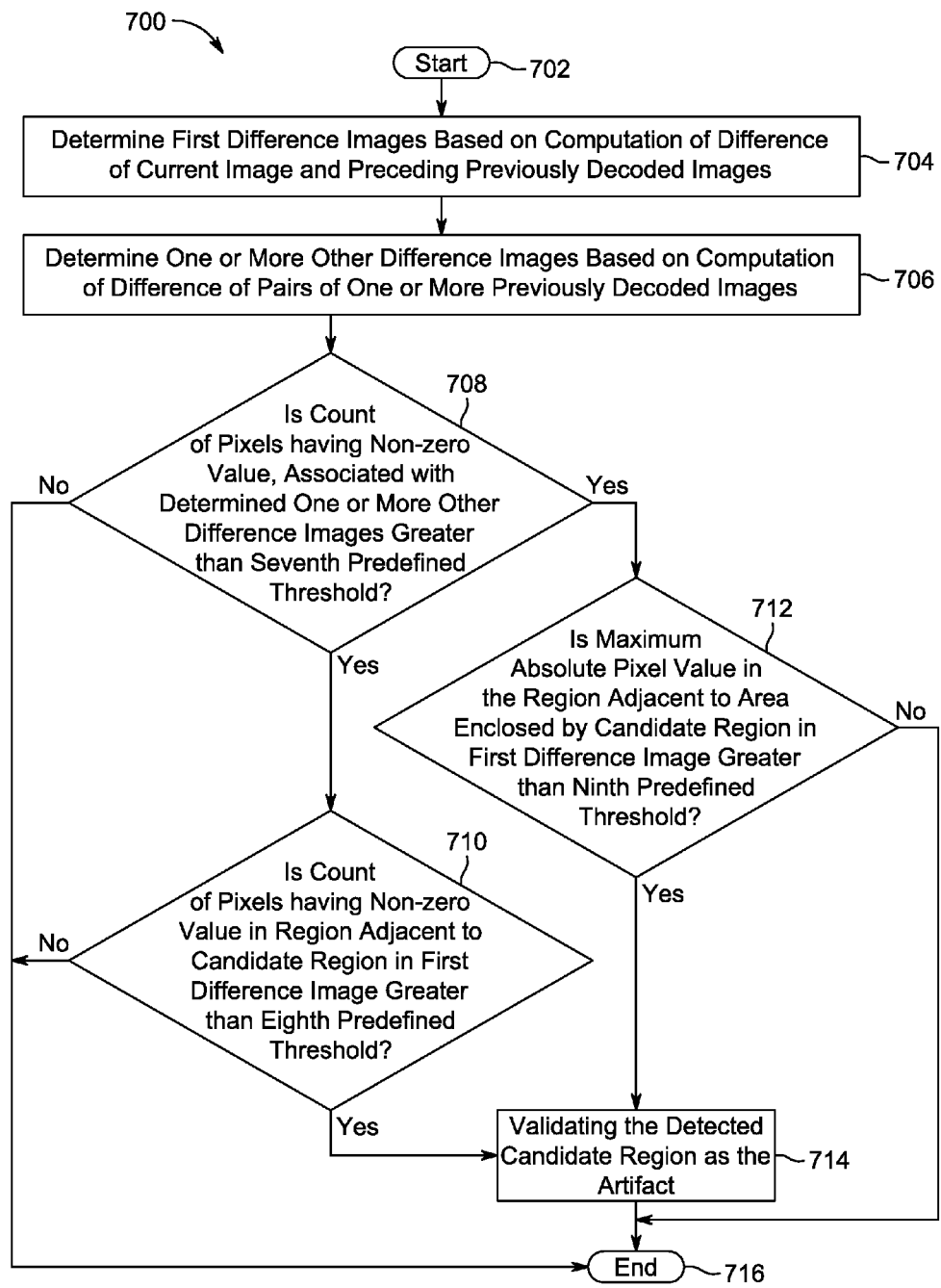
FIG. 7 illustrates a flow diagram for implementation of a third method for validation of the candidate region as artifact in one or more images of a video after application of error concealment strategy by the decoder.

FIG. 7 illustrates a flow diagram for implementation of a third method for validation of the candidate region as artifact in one or more images of a video after application of error concealment strategy after application of error concealment strategy by the decoder. FIG. 7 is explained in conjunction with the elements disclosed in FIGS. 1 to 4 and FIGS. 13 to 14.

With reference to FIG. 7, there is shown a flowchart 700 that corresponds to the one or more steps for validation of the detected candidate region as artifact based on one or more characteristics that correspond to a motion profile of the current image and a motion profile of the one or more previously decoded images, in accordance with the step 412 of the flowchart 400a. In an example embodiment, the motion profile of each image may be stored in the memory 204. The flowchart starts at step 702 and proceeds to step 704.

Figure 13:
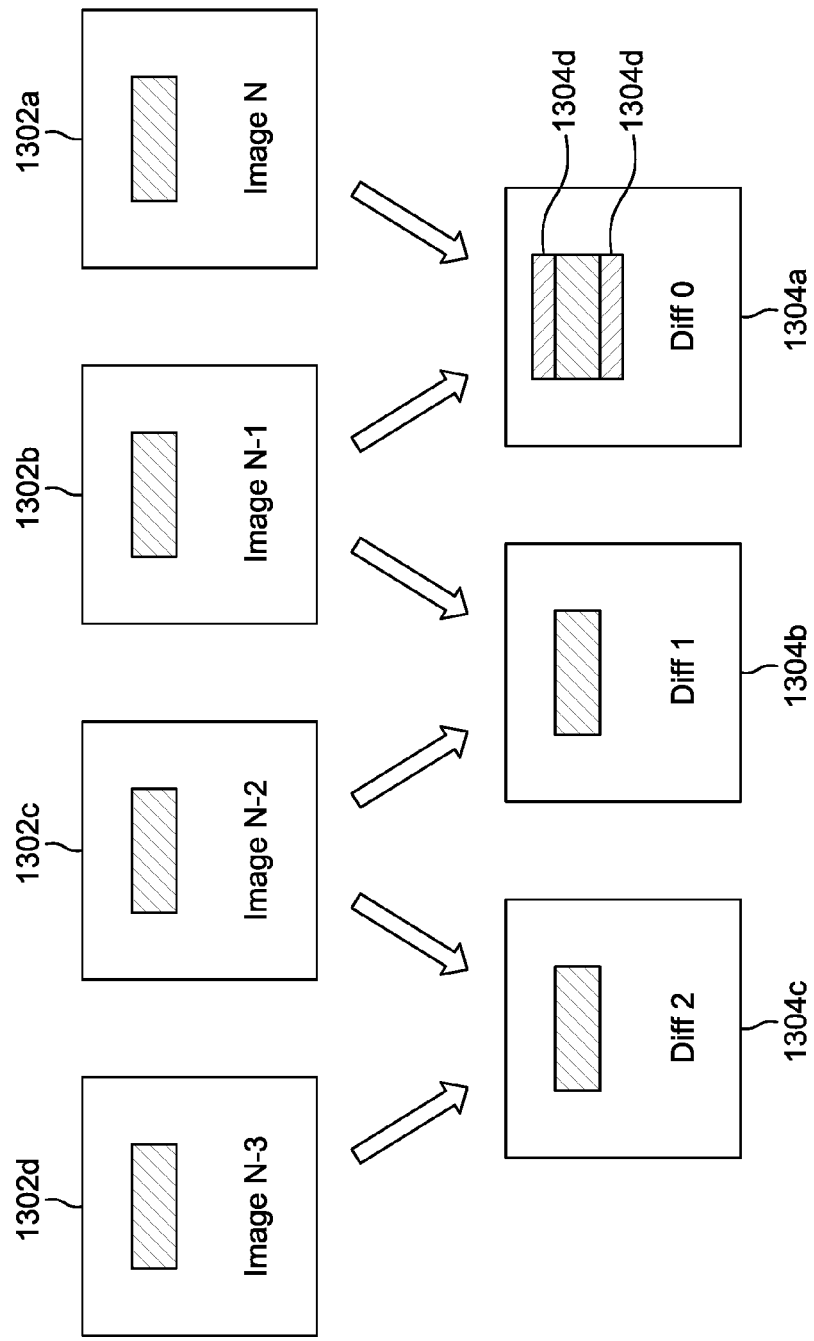
FIG. 13 illustrates a validation of the detected candidate region as artifact based on motion profiles of a current image and one or more previously decoded images, in accordance with the method for detection of artifacts in one or more images of a video after application of error concealment strategy by the decoder.

The current image may correspond to the "Image N", depicted as image 1302a in FIG. 13, and the immediately preceding previously decoded image may correspond to the "Image N−1" depicted as image 1302b in FIG. 13. Similarly, the other previously decoded images may correspond to "Image N−2" and "Image N−3", depicted as images 1302c and 1302d, respectively in FIG. 13.

At step 704, a first difference image may be determined based on a computation of a difference of the current image and a preceding previously decoded image. The first difference image that corresponds to the difference of "Image N" and "Image N−1" may correspond to "Diff 0", depicted as 1304a in FIG. 9.

At step 706, one or more other difference images may be determined based on a computation of a difference of the one or more pair of previously decoded images. In an example embodiment, the one or more other difference images may correspond to "Diff 1" determined based on a difference of "Image N−1" and "Image N−2" (depicted as 1304b in FIG. 9), and "Diff 2" determined based on a difference of "Image N−2" and "Image N−3" (depicted as 1304b in FIG. 9).

At step 708, the detected candidate region may be validated as artifact based on whether a count of pixels having a non-zero value, associated with candidate regions of the determined one or more other difference images ("Diff 1" and "Diff2") is greater than a seventh predefined threshold, "MOTION_PIXEL_THRESHOLD_1". This is represented by equation (5):

$$C1 > \text{MOTION\_PIXEL\_THRESHOLD\_1} * ((\text{area of the candidate region}) \quad (5)$$

where, "C1" corresponds to a count of non-zero pixels associated with the determined one or more other difference images ("Diff 1" and "Diff2"), and the "MOTION_PIXEL_THRESHOLD_1" corresponds to the sixth threshold whose exemplary value can be "0.15". The count of pixels "C1" essentially corresponds to percentage area of the candidate region that where the pixels should not be zero so as to indicate a high motion associated with the candidate region for the one or more previously decoded images ("Image N−2" and "Image N−3"). In instances when the count of pixels having a non-zero value, associated with the determined one or more other difference images is greater than a seventh predefined threshold, the control passes to the step 710. In instances when the count of pixels having a non-zero value, associated with the determined one or more other difference images is less than a seventh predefined threshold, the control passes to the end step 716.

At step 710, the detected candidate region may be validated as artifact based on whether a count of pixels in a region adjacent to the candidate region in the determined first difference image, having a non-zero value, associated with the determined first difference image ("Diff 0"), in a region corresponding to the detected candidate region, is greater than an eighth predefined threshold, "MOTION_PIXEL_THRESHOLD_2". This is represented by equation (6):

$$C2 > \text{MOTION\_PIXEL\_THRESHOLD\_2} * (\text{area of the candidate region}) \quad (6)$$

where "C2" corresponds to a count of non-zero pixels in a region adjacent to the candidate region associated with the determined first difference image ("Diff 0"), "MOTION_PIXEL_THRESHOLD_2" corresponds to the seventh threshold whose exemplary value can be "0.85". In instances when a count of such pixels having a non-zero value, associated with the determined first difference image in a region adjacent to an area corresponding to the detected candidate region, is greater than the eighth predefined threshold, the control passes to step 712. In instances when a count of pixels having a non-zero value, associated with the determined first difference image in a region adjacent to an area corresponding to the detected candidate region, is less than the eighth predefined threshold, the control passes to end step 716.

In an example embodiment, instances when a count of such pixels having a non-zero value, associated with the determined first difference image in a region adjacent to an area corresponding to the detected candidate region, is greater than the eighth predefined threshold, the control may passes directly to step 714, thereby bypassing the step 712.

At step 712, the candidate region may be validated as an artifact based on determination of whether a maximum of absolute pixel value of pixels in a region adjacent to the area enclosed by the candidate region (depicted by the region 1304*d* in FIG. 13), is greater than a ninth predefined threshold "MINIMUM_DIFF_VALUE". This is represented by equation (7):

$$D > \text{MINIMUM\_DIFF\_THRESHOLD} \quad (7)$$

where, "D" is the maximum absolute pixel value in a region adjacent to the area enclosed by the candidate region of the first difference image, and "MINIMUM_DIFF_VALUE" corresponds to a predefined constant value such as "40". In an example embodiment, "D" may correspond to an average f the difference values in the region 1304*b*.

In an example embodiment, a high value of difference "D" in an area in the difference image "Diff 0" that is adjacent to the candidate region essentially corresponds to a high degree of motion between the current image and the preceding previously decoded image. In instances when the maximum of absolute pixel value of pixels in a region adjacent to the area enclosed by the candidate region (depicted by the region 1304*d* in FIG. 13), is greater than the ninth predefined threshold "MINIMUM_DIFF_VALUE", the control passes to step 714. In instances when the maximum of absolute pixel value of pixels in a region adjacent to the area enclosed by the candidate region is not greater than the ninth predefined threshold "MINIMUM_DIFF_VALUE", the control passes to end step 716. At step 714, the candidate region may be validated as the artifact. The control passes to end step 716.

Figure 8:
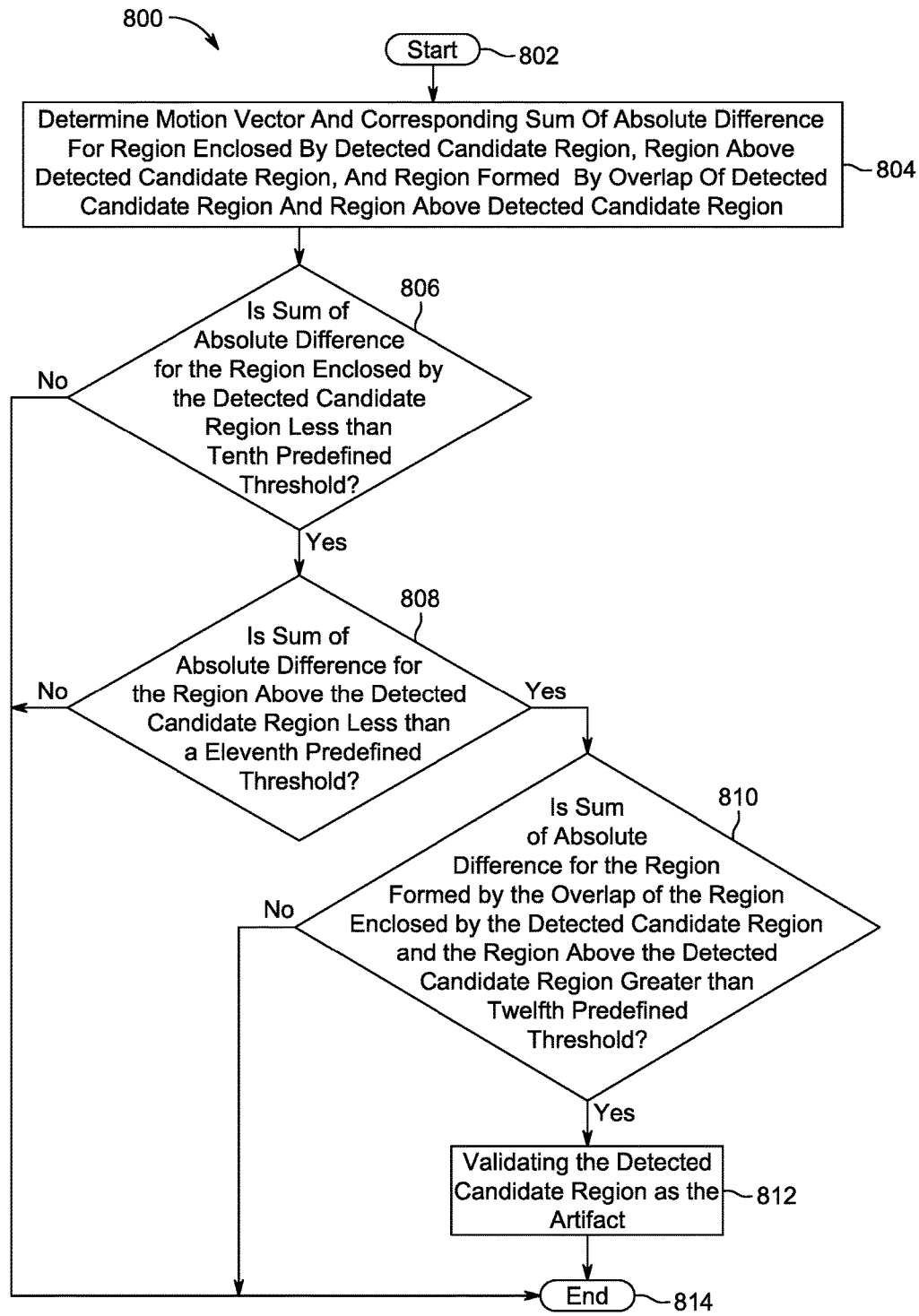
FIG. 8 illustrates a flow diagram for implementation of a fourth method for validation of the candidate region as artifact in one or more images of a video after application of error concealment strategy by the decoder.

FIG. 8 illustrates a flow diagram for implementation of a fourth method for validation of the candidate region as artifact in one or more images of a video after application of error concealment strategy after application of error concealment strategy by the decoder. FIG. 8 is explained in conjunction with the elements disclosed in FIGS. 1 to 4 and FIG. 14.

Figure 14:
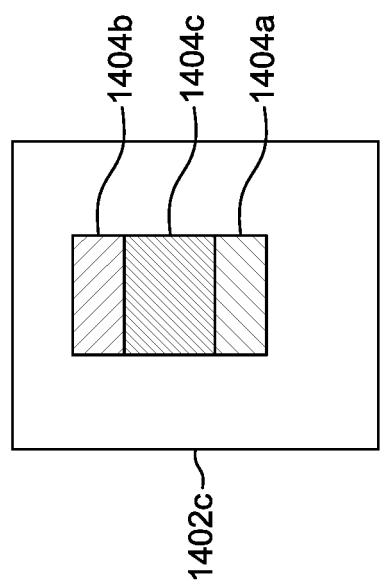
FIG. 14 illustrates a validation of the detected candidate region as artifact based on motion vectors associated with the a current image and the previously decoded image, in accordance with the method for detection of artifacts in one or more images of a video after application of error concealment strategy by the decoder.

With reference to FIG. 8, there is shown a flowchart 800 that corresponds to the one or more steps for validation of the detected candidate region as artifact based on one or more characteristics that correspond to motion vectors and corresponding sum of absolute difference (SAD) associated with the current image and the previously decoded image, in accordance with the step 414 of the flowchart 400. In an example embodiment, the current image may correspond to the image 1402*a*, a first region 1404*a* enclosed by the detected candidate region, a second region 1404*b* may correspond to may correspond to a region above the detected candidate region, and a third region 1404*c* may correspond to a region formed by overlap of the first region 1404*a* and the second region 1404*b*, as depicted in FIG. 14. The flowchart starts at step 802 and proceeds to step 804.

At step 804, motion vector and SAD that corresponds to the motion vector may be determined for the first region, the second region, and the third region, by the CPU 202. In an example embodiment, the detected candidate region may be validated as an artifact based on determination of SAD determined for the plurality of regions with a plurality of thresholds. The plurality of regions may comprise the first region, the second region, and the third region. The plurality of thresholds may comprise a tenth predefined threshold, an eleventh predefined threshold. In an example embodiment, the value of the twelfth predefined threshold is greater than the eleventh predefined threshold, and the value of the eleventh predefined threshold is greater than the tenth predefined threshold.

At step 806, it may be determined whether SAD for the first region is less than the tenth predefined threshold in accordance with the equation (8):

$$SAD_1 < TH_{10} \quad (8)$$

where, $SAD_1$ corresponds to determined SAD for the first region and $TH_{10}$ corresponds to the tenth predefined threshold. In instances when $SAD_1$ is less than $TH_{10}$, the control passes to step 808. In instances when $SAD_1$ is not less than $TH_{10}$, the control passes to end step 814.

At step 808, it may be determined whether SAD for the second region is less than the eleventh predefined threshold in accordance with the equation (9):

$$SAD_2 < TH_{11} \quad (9)$$

where, $SAD_2$ corresponds to determined SAD for the second region and $TH_{11}$ corresponds to the eleventh predefined threshold. In instances when $SAD_2$ is less than $TH_{11}$, the control passes to step 810. In instances when $SAD_2$ is not less than $TH_{11}$, the control passes to end step 814.

At step 810, it may be determined whether SAD for the third region is greater than the twelfth predefined threshold in accordance with the equation (10):

$$SAD_3 > TH_{12} \quad (10)$$

where, $SAD_3$ corresponds to determined SAD for the third region and $TH_{12}$ corresponds to the twelfth predefined threshold. In instances when $SAD_3$ is greater than $TH_{12}$, the control passes to step 812. In instances when $SAD_3$ is not less than $TH_{12}$, the control passes to end step 814.

At step 812, the detected candidate region may be validated at the artifact. The control passes to end step 814. A person of ordinary skill in the art will appreciate that the steps 408 to 414 of the flowcharts depicted in FIGS. 5 to 8, respectively may be performed as a part of a parallel processing by the CPU 202. In another embodiment, the aforementioned steps may be performed sequentially.

Figure 9:
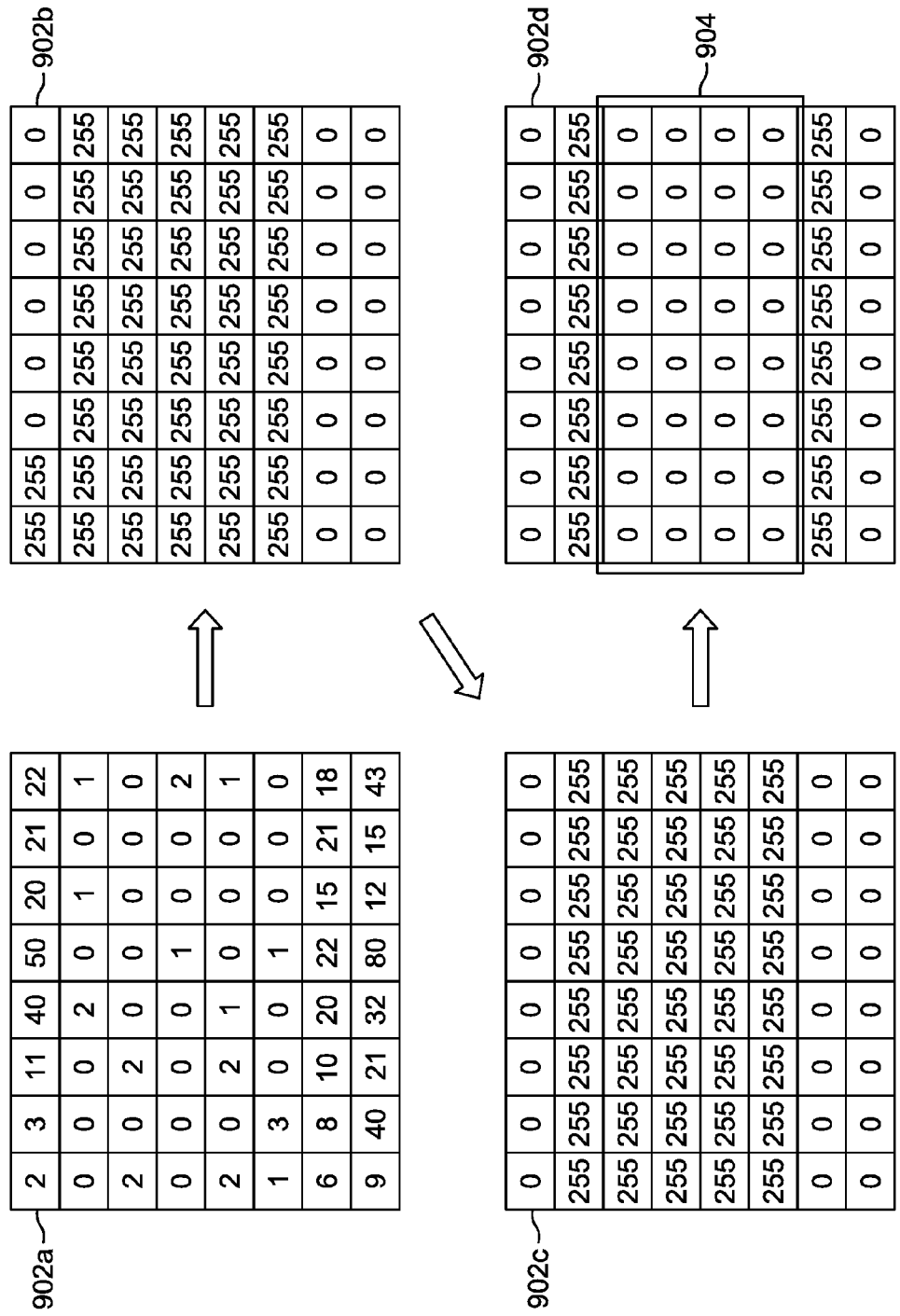
FIG. 9 illustrates a determination of a candidate region in accordance with the method for detection of artifacts in one or more images of a video after application of error concealment by the decoder.

FIG. 9 illustrates a determination of a candidate region in accordance with the method for detection of artifacts in one or more images of a video after application of error concealment strategy after application of error concealment strategy by the decoder. FIG. 9 is explained in conjunction with the elements disclosed in FIG. 3.

With reference to FIG. 9 there is shown an absolute difference image 902*a*. The CPU 202 may be configured to compare the obtained pixel values of the absolute difference image with a first predefined threshold, such as a value "5". The CPU 202 may be further configured to replace the pixel values less than the first predefined threshold with a value, such as "255" and the pixel values greater than the predefined threshold may be replaced with the value "0", to determine the threshold marked buffer (TMB) 902b.

In an example embodiment, the CPU 202 may be configured to perform an erode operation on the TMB 902b to determine the in order to detect a candidate region depicted in the TMB 902c. The CPU 202 may be further configured to determine Difference Image Vertical Gradient Buffer (DIVGB) 902d, in accordance with the equation (1), as explained in FIG. 3 In the determined DIVGB, the region 904 may correspond to the detected candidate region. The detected candidate region may be validated based on one or more techniques disclosed in FIGS. 5 to 8.

FIG. 10 illustrates a validation of the detected candidate region based on formation of an edge, in accordance with the method for detection of artifacts in one or more images of a video after application of error concealment strategy after application of error concealment strategy by the decoder.

With reference to FIG. 10, there is shown a gradient image 1002a of the current image, and a gradient image 1002b of the previously decoded image. Further, a depicted candidate region 1004a may correspond to the gradient image 1002a, and a depicted candidate region 1004b may correspond to the candidate region 1004b. In an example embodiment, gradient values in a first region and a second region that correspond to boundaries of the candidate region 1004a and the candidate region 1004b, may be compared with the "GRADIENT_THRESHOLD" to determine as count of pixels greater than the "GRADIENT_THRESHOLD". The candidate region 1004a may be validated, by the CPU 202, as an artifact based on the comparison (as explained in detail in FIG. 5.

Figure 11:
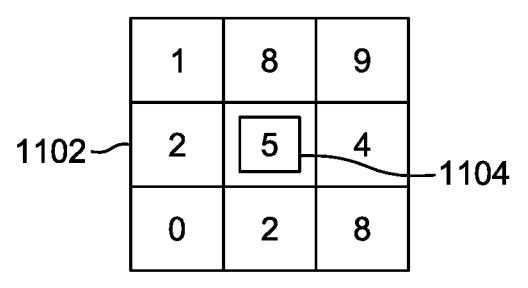

FIG. 11 illustrates a non-maximal suppression of the edges of the detected candidate region, in accordance with the method for detection of artifacts in one or more images of a video after application of error concealment strategy by the decoder.

With reference to FIG. 11, there is shown a group of pixels 1102 that may comprise a pixel-of-interest 1104. Based on the computed orientation by the CPU 202, in accordance with the equation (4), the pixel-of-interest 1104 may be compared with one or more pixels, from the group of pixels 1102, adjacent to the pixel-of-interest 1104. In an example embodiment, the value of the pixel-of-interest 1104 may be "5". In such an embodiment, when the computed orientation is "0 degree", the value of the pixel-of-interest 1104 may be compared with the value of the adjacent pixels from the group of pixels 1102, in the direction of the computed orientation (horizontal direction). In an example embodiment, the CPU 202 may be further compared to retain the value of the pixel-of-interest 1104, when the value of the pixels-of-interest 1104 is greater than those of adjacent pixels in the direction of the computed orientation. For example, the value "5" will be compared with the values "2" and "4" that are adjacent to the pixel-of-interest in the horizontal direction. Further, as the value "5" is greater than the values of the adjacent pixels ("2" and "4"), the pixel value of the pixel-of-interest will be unchanged.

In an example embodiment, when the computed orientation is "90 degree", the value of the pixel-of-interest 1104 may be compared with the value of the adjacent pixels from the group of pixels 1102, in the direction of the computed orientation (vertical direction). In an example embodiment, the CPU 202 may be further compared to retain the value of the pixel-of-interest 1104, when the value of the pixels-of-interest 1104 is greater than those of adjacent pixels in the direction of the computed orientation. For example, the value "5" will be compared with the values "8" and "2" that are adjacent to the pixel-of-interest in the vertical direction. Further, as the value "5" is less than the value of the adjacent pixels ("8"), the pixel value of the pixel-of-interest will be changed to "0". Based on the foregoing non-maximal suppression, pixel wide edges of the principal edge of the first region may be determined by the CPU 202.

FIG. 12 illustrates a validation of the detected candidate as artifact region based on an orientation of an edge of the candidate region, in accordance with the method for detection of artifacts in one or more images of a video after application of error concealment strategy by the decoder. FIG. 12 is explained in conjunction with the elements disclosed in FIG. 6.

With reference to the FIG. 12, there is shown the current image 1202a and the detected candidate region 1204a that correspond to the current image 1202a. There are further shown the second region 1206a, 1206b, 1206c, and 1206d that correspond to an absolute difference image. In an example embodiment, the second region corresponds to the regions 1206a and 1206b when the determined orientation is "0 degree". In another embodiment, the second region corresponds to the regions 1206c and 1206d when the determined orientation is "90 degree".

FIG. 13 illustrates a validation of the detected candidate region as artifact based on motion profiles of a current image and one or more previously decoded images, in accordance with the method for detection of artifacts in one or more images of a video after application of error concealment strategy by the decoder. FIG. 13 is explained in conjunction with the elements disclosed in FIG. 7. The depicted elements of the FIG. 13 and their correspondence have been explained in detail in FIG. 7.

FIG. 14 illustrates a validation of the detected candidate region as artifact based on motion vectors associated with the a current image and the previously decoded image, in accordance with the method for detection of artifacts in one or more images of a video after application of error concealment strategy by the decoder. FIG. 14 is explained in conjunction with the elements disclosed in FIG. 8. The depicted elements of the FIG. 14 and their correspondence have been explained in detail in FIG. 8.

In an example embodiment, a non-transient computer readable memory storing one or more instructions for causing one or more processors for detecting artifacts in one or more images of a video after application of error concealment strategy by a decoder is provided. The one or more processors upon executing the instructions is configured for determining an absolute difference image by subtracting a current image and a previously decoded image; determining a Threshold Marked Buffer (FMB) by comparing pixel values of the determined absolute difference image with a first predefined threshold, the pixel values of the determined absolute difference image are replaced with a first pixel value and a second pixel value based on the comparison; detecting a candidate region by determining a pair of edges in the determined TMB having length above a second predefined threshold, a distance between the pair of edges above a third predefined threshold, and having pixels between the pair of edges in the absolute difference image with pixel value less than a fourth predefined threshold; and validating the detected candidate region based on comparison of one or more characteristics of the detected candidate region with respect to one or more characteristics of the current image and/or one or more of previously decoded image.

In another example embodiment, a non-transient computer readable memory storing one or more instructions for causing one or more processors for detecting artifacts in one or more images of a video after application of error concealment strategy by a decoder is provided. The one or more processors upon executing the instructions is configured for determining an absolute difference image by subtracting a current image and a previously decoded image; determining a Threshold Marked Buffer (FMB) by comparing pixel values of the determined absolute difference image with a first predefined threshold, the pixel values of the determined absolute difference image are replaced with a first pixel value and a second pixel value based on the comparison; detecting a candidate region by determining a pair of edges in the TMB having length above a second predefined threshold, a distance between the pair of edges above a third predefined threshold, and having pixels between the pair of edges in the absolute difference image with pixel value less than a fourth predefined threshold; determining a gradient image of the current image and a gradient image of the previously decoded image; determining a first region in the gradient image of the current image corresponding to one or more edges of the detected candidate region and a second region in the gradient image of the previously decoded image corresponding to the one or more edges of the detected candidate region; determining a first count of pixels for which a gradient value in the pair of edges of the determined first region of the gradient image of the current image is greater than a gradient threshold; determining a second count of pixels for which a gradient value in the pair of edges of the determined second region of the gradient image of the previously decoded image is greater than the gradient threshold; determining a first set of orientations of one or more edges of the first region; determining an orientation of a principal edge of the first region based on a histogram of the first set of orientations of the one or more edges of the first region, the orientation of the principal edge of the first region corresponds to a bin index having maximum value in the histogram of the first set of orientations; determining a second set of orientations of one or more edges of the second region; determining an orientation of a principal edge of the second region, based on a histogram of the second set of orientations of the one or more edges of the second region, the orientation of a principal edge of the second region corresponds to a bin index having maximum value in the histogram of the second set of orientations; determining a first difference image based on computation of a difference of the current image and a preceding previously decoded image; determining one or more of other difference images based on computation of a difference of the one or more pair of previously decoded images; determining motion vectors and a corresponding sum of absolute difference for a region enclosed by the detected candidate region, a region above the detected candidate region, and a region formed by overlap of the detected candidate region and the region above the detected candidate region; validating the detected candidate region as the artifact if the first count of pixels is greater than the second count of pixels by a fifth predefined threshold, and/or if the difference of the bin index corresponding to the first region and the second region exceeds sixth predefined threshold, and/or if at least a count of pixels having a non-zero value, associated with the determined one or more other difference images is greater than a seventh predefined threshold, and if a count of pixels having a non-zero value, associated with the determined first difference image, in a region adjacent to an area corresponding to the detected candidate region, is greater than an eighth predefined threshold, or a maximum difference value associated with the determined first difference image in an area adjacent to the detected candidate region is greater than a ninth predefined threshold, and/or if at least the determined sum of absolute difference for the region enclosed by the detected candidate region is less than a tenth predefined threshold, the determined sum of absolute difference for the region above the detected candidate region is less than a eleventh predefined threshold, and the determined sum of absolute difference for the region formed by the overlap of the region enclosed by the detected candidate region and the region above the detected candidate region is greater than a twelfth predefined threshold, the twelfth predefined threshold is greater than the eleventh predefined threshold and tenth predefined threshold is greater than the tenth predefined threshold.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e. g., a modem or network connection).

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps comprising determination of an absolute difference image by subtraction of a current image and a previously decoded image. The method may further comprise determining a Threshold Marked Buffer (TMB) by comparing pixel values of the determined absolute difference image with a first predefined threshold. The pixel values of the determined absolute difference image are replaced with a first pixel value and a second pixel value based on the comparison. The method may further comprise detection of a candidate region by determination of a pair of edges in the determined TMB such that the length of the pair of edges is above a second predefined threshold. Further, the distance between the pair of edges is above a third predefined threshold, and the pixels between the pair of edges in the absolute difference image are less than a fourth predefined threshold. The method may further comprise validation of detected candidate region based on comparison of one or more characteristics of the detected candidate region with respect to one or more characteristics of the current image and/or one or more of previously decoded images.

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for detection of artifacts in one or more images of a video after application of error concealment strategy by a decoder, the method comprising:
    determining an absolute difference image by subtracting a current image and a previously decoded image;
    detecting a candidate region by determining a pair of edges in a threshold marked buffer having length above a second predefined threshold, a distance between the pair of edges above a third predefined threshold, and having pixels between the pair of edges in the determined absolute difference image with pixel value less than a fourth predefined threshold;
    determining a motion vector and the corresponding sum of absolute difference for a region enclosed by the detected candidate region, a region above the detected candidate region, and a region formed by overlap of the detected candidate region and the region above the detected candidate region;
    validating the detected candidate region based on comparison of one or more characteristics of the detected candidate region with respect to one or more characteristics of the current image and/or one or more of previously decoded image;
    determining a gradient image of the current image and a gradient image of the previously decoded image:
    determining a first region in the gradient image of the current image corresponding to one or more edges of the detected candidate region and a second region in the gradient image of the previously decoded image corresponding to the one or more edges of the detected candidate region, wherein the first region comprises a region inside the detected candidate region corresponding to the current image and the second region comprises a region adjacent to the detected candidate region corresponding to the determined absolute difference image;
    determining a first set of orientations of one or more edges of the first region;
    determining an orientation of a principal edge of the first region based on a histogram of the first set of orientations of the one or more edges of the first region, the orientation of the principal edge of the first region corresponds to a bin index having maximum value in the histogram of the first set of orientations;
    determining a second set of orientations of one or more edges of the second region;
    determining an orientation of a principal edge of the second region, based on a histogram of the second set of orientations of the one or more edges of the second region, the orientation of a principal edge of the second region corresponds to a bin index having maximum value in the histogram of the second set of orientations; and
    validating the detected candidate region as the artifact if an absolute difference of the bin index corresponding to the first region and the second region is less than a sixth predefined threshold.

2. The method of claim 1, wherein the one or more images comprise one or more decoded frames of the video.

3. The method of claim 1, wherein the one or more images comprise a set of even fields and a set of odd fields, corresponding to the decoded images of the video.

4. The method of claim 1, wherein the detected candidate region comprises a region of pixels or a slice of pixels.

5. The method of claim 1, wherein the pair of edges comprise of a pair of horizontal edges, or a pair of vertical edges.

6. The method of claim 1, wherein the threshold marked buffer is determined by comparing pixel values of the determined absolute difference image with a first predefined threshold, the pixel values of the determined absolute difference image are replaced with a first pixel value and a second pixel value based on the comparison.

7. The method of claim 1, further comprising performing an erode operation on the determined threshold marked buffer to remove pixels or a slice of pixels from the threshold marked buffer, based on a predefined mask.

8. The method of claim 7, further comprising determining one or more vertical gradients for the determined threshold marked buffer by calculating a difference of a pair of alternate rows of the eroded threshold marked buffer.

9. The method of claim 1, wherein the one or more characteristics correspond to a formation of an edge corresponding to the detected candidate region, in the current image and/or the previously decoded image.

10. The method of claim 9, further comprising:
    determining a first count of pixels for which a gradient value in the pair of edges of the determined first region of the gradient image of the current image is greater than a gradient threshold;
    determining a second count of pixels for which a gradient value in the pair of edges of the determined second region of the gradient image of the previously decoded image is greater than the gradient threshold; and
    validating the detected candidate regions as the artifact if the first count of pixels is greater than the second count of pixels by a fifth predefined threshold.

11. The method of claim 1, wherein the one or more characteristics correspond to the orientations of the one or more edges of the first region and the second region.

12. The method of claim 1, wherein the edges of the detected candidate region in the determined absolute difference image and the current image are determined by application of a filter selected from the group consisting of Gabor filter, Sobel filter, Canny edge detector, Prewitt filter, and Robert cross operator.

13. The method of claim 1, wherein the one or more characteristics correspond to a motion profile of the current image and a motion profile of the one or more previously decoded images, in a region corresponding to a vicinity of edges of the detected candidate region.

14. The method of claim 13, comprising:
    determining a first difference image based on computation of a difference of the current image and a preceding previously decoded image;
    determining one or more of other difference images based on computation of a difference of the one or more pair of previously decoded images; and
    validating the detected candidate region as the artifact if, at least a count of pixels having a non-zero value, associated with the determined one or more other difference images is greater than a seventh predefined threshold, and a count of pixels having a non-zero value, associated with the determined first difference image, in a region adjacent to an area corresponding to the detected candidate region, is greater than an eighth predefined threshold, or a maximum of absolute pixel value associated with one or more pixels in a region adjacent to the detected candidate region is greater than a ninth predefined threshold.

15. The method of claim 1, wherein the one or more characteristics correspond to motion vectors and corresponding sum of absolute difference associated with the current image and the previously decoded image.

16. The method of claim 15, comprising:
   determining a motion vector and the corresponding sum of absolute difference for a region enclosed by the detected candidate region, a region above the detected candidate region, and a region formed by overlap of the detected candidate region and the region above the detected candidate region; and
   validating the detected candidate region as the artifact if at least the determined sum of absolute difference for the region enclosed by the detected candidate region is less than a tenth predefined threshold, the determined sum of absolute difference for the region above the detected candidate region is less than an eleventh predefined threshold, and the determined sum of absolute difference for the region formed by the overlap of the region enclosed by the detected candidate region and the region above the detected candidate region is greater than a twelfth predefined threshold, the twelfth predefined threshold is greater than the eleventh predefined threshold and eleventh predefined threshold is greater than the tenth predefined threshold.

17. A method for detection of artifacts in one or more images of a video after application of error concealment strategy by a decoder, the method comprising:
   determining an absolute difference image by subtracting a current image and a previously decoded image;
   determining a threshold marked buffer by comparing pixel values of the determined absolute difference image with a first predefined threshold, the pixel values of the determined absolute difference image are replaced with a first pixel value and a second pixel value based on the comparison;
   detecting a candidate region by determining a pair of edges in the determined threshold marked buffer having length above a second predefined threshold, a distance between the pair of edges above a third predefined threshold, and having pixels between the pair of edges in the determined absolute difference image with pixel value less than a fourth predefined threshold;
   determining a gradient image of the current image and a gradient image of the previously decoded image;
   determining a first region in the gradient image of the current image corresponding to one or more edges of the detected candidate region and a second region in the gradient image of the previously decoded image corresponding to the one or more edges of the detected candidate region;
   determining a first count of pixels for which a gradient value in the pair of edges of the determined first region of the gradient image of the current image is greater than a gradient threshold;
   determining a second count of pixels for which a gradient value in the pair of edges of the determined second region of the gradient image of the previously decoded image is greater than the gradient threshold;
   determining a first set of orientations of one or more edges of the first region;
   determining an orientation of a principal edge of the first region based on a histogram of the first set of orientations of the one or more edges of the first region, the orientation of the principal edge of the first region corresponds to a bin index having maximum value in the histogram of the first set of orientations;
   determining a second set of orientations of one or more edges of the second region;
   determining an orientation of a principal edge of the second region, based on a histogram of the second set of orientations of the one or more edges of the second region, the orientation of a principal edge of the second region corresponds to a bin index having maximum value in the histogram of the second set of orientations;
   determining a first difference image based on computation of a difference of the current image and a preceding previously decoded image: determining one or more of other difference images based on computation of a difference of the one or more pair of previously decoded images;
   determining one or more of other difference images based on computation of a difference of the one or more pair of previously decoded images;
   determining motion vectors and a corresponding sum of absolute difference for a region enclosed by the detected candidate region, a region above the detected candidate region, and a region formed by overlap of the detected candidate region and the region above the detected candidate region;
   validating the detected candidate region as the artifact
      if the first count of pixels is greater than the second count of pixels by a fifth predefined threshold, and/or
      if an absolute difference of the bin index corresponding to the first region and the second region is less than a sixth predefined threshold, and/or
      if at least a count of pixels having a non-zero value, associated with the determined one or more other difference images is greater than a seventh predefined threshold, and
      if a count of pixels having a non-Zero value, associated with the determined first difference image, in a region adjacent to an area corresponding to the detected candidate region, is greater than an eighth predefined threshold, or
      a maximum of absolute pixel value associated with one or more pixels in a region adjacent to the detected candidate region is greater than a ninth predefined threshold, and/or
      if at least the determined sum of absolute difference for the region enclosed by the detected candidate region is less than a tenth predefined threshold, the determined sum of absolute difference for the region above the detected candidate region is less than an eleventh predefined threshold, and the determined sum of absolute difference for the region formed by the overlap of the region enclosed by the detected candidate region and the region above the detected candidate region is greater than a twelfth predefined threshold, the twelfth predefined threshold is greater than the eleventh predefined threshold and eleventh predefined threshold is greater than the tenth predefined threshold.

18. A non-transitory computer readable medium storing a program causing a computer to execute a method for detection of artifacts in one or more images of a video after application of error concealment strategy by a decoder, the method comprising:

determining an absolute difference image by subtracting a current image and a previously decoded image;

determining a threshold marked buffer by comparing pixel values of the determined absolute difference image with a first predefined threshold, the pixel values of the determined absolute difference image are replaced with a first pixel value and a second pixel value based on the comparison;

detecting a candidate region by determining a pair of edges in the threshold marked buffer having length above a second predefined threshold, a distance between the pair of edges above a third predefined threshold, and having pixels between the pair of edges in the determined absolute difference image with pixel value less than a fourth predefined threshold;

determining a motion vector and the corresponding sum of absolute difference for a region enclosed by the detected candidate region, a region above the detected candidate region, and a region formed by overlap of the detected candidate region and the region above the detected candidate region;

validating the detected candidate region based on comparison of one or more characteristics of the detected candidate region with respect to one or more characteristics of the current image and/or one or more of previously decoded image;

determining a gradient image of the current image and a gradient image of the previously decoded image:

determining a first region in the gradient image of the current image corresponding to one or more edges of the detected candidate region and a second region in the gradient image of the previously decoded image corresponding to the one or more edges of the detected candidate region, wherein the first region comprises a region inside the detected candidate region corresponding to the current image and the second region comprises a region adjacent to the detected candidate region corresponding to the determined absolute difference image;

determining a first set of orientations of one or more edges of the first region;

determining an orientation of a principal edge of the first region based on a histogram of the first set of orientations of the one or more edges of the first region, the orientation of the principal edge of the first region corresponds to a bin index having maximum value in the histogram of the first set of orientations;

determining a second set of orientations of one or more edges of the second region;

determining an orientation of a principal edge of the second region, based on a histogram of the second set of orientations of the one or more edges of the second region, the orientation of a principal edge of the second region corresponds to a bin index having maximum value in the histogram of the second set of orientations; and validating the detected candidate region as the artifact if an absolute difference of the bin index corresponding to the first region and the second region is less than a sixth predefined threshold.

* * * * *